(12) United States Patent
Momose et al.

(10) Patent No.: US 7,715,047 B2
(45) Date of Patent: May 11, 2010

(54) IMAGE EDITING DEVICE

(75) Inventors: Kiyoharu Momose, Hata-machi (JP); Taira Ohara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 412 days.

(21) Appl. No.: 11/709,076

(22) Filed: Feb. 20, 2007

(65) Prior Publication Data
US 2007/0195347 A1 Aug. 23, 2007

(30) Foreign Application Priority Data

| Feb. 17, 2006 | (JP) | 2006-041468 |
| Feb. 20, 2006 | (JP) | 2006-042750 |
| Feb. 22, 2006 | (JP) | 2006-045811 |

(51) Int. Cl.
H04N 1/60 (2006.01)
H04N 1/46 (2006.01)
G03F 3/08 (2006.01)
G06K 9/00 (2006.01)
G09G 5/02 (2006.01)

(52) U.S. Cl. .......... 358/1.9; 358/515; 358/518; 358/520; 382/162; 382/167; 345/589; 345/619

(58) Field of Classification Search .......... 358/1.9, 358/518, 521, 300, 527, 515, 520; 345/589, 345/594, 619; 715/838, 764; 382/162, 167, 382/173
See application file for complete search history.

(56) References Cited

U.S. PATENT DOCUMENTS

| 5,200,832 A | * | 4/1993 | Taniuchi et al. ............. 358/300 |
| 5,659,490 A | | 8/1997 | Imamura |
| 6,750,890 B1 | * | 6/2004 | Sugimoto .................... 715/838 |
| 7,009,733 B2 | * | 3/2006 | Gruzdev et al. .............. 358/1.9 |
| 7,206,445 B2 | | 4/2007 | Takemoto |
| 7,365,878 B2 | | 4/2008 | Nakagawa |
| 2004/0135790 A1 | * | 7/2004 | Moore ........................ 345/589 |
| 2005/0212394 A1 | | 9/2005 | Lin et al. |
| 2005/0212819 A1 | | 9/2005 | Kubo et al. |
| 2007/0009153 A1 | * | 1/2007 | Gallafent et al. ............ 382/173 |
| 2007/0126751 A1 | * | 6/2007 | Crona ........................ 345/589 |

FOREIGN PATENT DOCUMENTS

| JP | 07-099589 | 4/1995 |
| JP | 07-220043 | 8/1995 |
| JP | 8-115431 | 5/1996 |

(Continued)

*Primary Examiner*—Charlotte M Baker
(74) *Attorney, Agent, or Firm*—Nutter McClennen & Fish LLP; John J. Penny, Jr.

(57) ABSTRACT

An image editing device has the following (A) through (C): (A) an image display section on which an image to be edited is displayed; (B) an information obtaining section that obtains information regarding a pixel that has been arbitrarily designated by a user from the image that has been displayed on the image display section, and information regarding a desired color that has been designated by the user for the pixel; and (C) a color adjustment section that adjusts a color of the overall image, in order to change a color of the pixel that has been designated by the user to the desired color, based on the information regarding the pixel and the information regarding the desired color, which have been obtained by the information obtaining section.

13 Claims, 23 Drawing Sheets

FOREIGN PATENT DOCUMENTS

| | | |
|---|---|---|
| JP | 09-258706 | 10/1997 |
| JP | 11-345321 | 12/1999 |
| JP | 2000-013628 | 1/2000 |
| JP | 2001-251531 | 9/2001 |
| JP | 2002-016798 | 1/2002 |
| JP | 2003-259137 | 9/2003 |
| JP | 2004-153684 | 5/2004 |
| JP | 2004-282156 | 10/2004 |
| JP | 2005-217618 | 8/2005 |
| JP | 2005-286653 | 10/2005 |
| JP | 2005-303569 | 10/2005 |

* cited by examiner

| histogram adjustment | red (R) | shadow input value | α11 |
| --- | --- | --- | --- |
| | | highlight input value | α12 |
| | | shadow output value | α13 |
| | | highlight output value | α14 |
| | | gamma value | α15 |
| | green (G) | shadow input value | α21 |
| | | highlight input value | α22 |
| | | shadow output value | α23 |
| | | highlight output value | α24 |
| | | gamma value | α25 |
| | blue (B) | shadow input value | α31 |
| | | highlight input value | α32 |
| | | shadow output value | α33 |
| | | highlight output value | α34 |
| | | gamma value | α35 |
| | tone curve | tone curve lower end portion shape | α41 |
| | | tone curve upper end portion shape | α42 |
| | grayscale balance adjustment value | | α51 |

Fig.10A

| darkness correction | red (R) | P1 | input coordinates | β 11 |
|---|---|---|---|---|
| | | | output coordinates | β 12 |
| | | P2 | input coordinates | β 13 |
| | | | output coordinates | β 14 |
| | | ⋮ | ⋮ | ⋮ |
| | green (G) | P1 | input coordinates | β 21 |
| | | | output coordinates | β 22 |
| | | P2 | input coordinates | β 23 |
| | | | output coordinates | β 24 |
| | | ⋮ | ⋮ | ⋮ |
| | blue (B) | P1 | input coordinates | β 31 |
| | | | output coordinates | β 32 |
| | | P2 | input coordinates | β 33 |
| | | | output coordinates | β 34 |
| | | ⋮ | ⋮ | ⋮ |

Fig.10B

| image adjustment | brightness | | $\gamma 1$ |
|---|---|---|---|
| | contrast | | $\gamma 2$ |
| | saturation | | $\gamma 3$ |
| | color balance | cyan-red | $\gamma 4$ |
| | | magenta-green | $\gamma 5$ |
| | | yellow-blue | $\gamma 6$ |

Fig.10C value of "K1" when Kr=0.2, Kg=0.6, and Kb=0.2

| direction of hue change | R | G | B |
|---|---|---|---|
| red (R) direction | 4 | −1 | −1 |
| green (G) direction | −3 | 2 | 2 |
| blue (B) direction | −1 | −1 | 4 |
| cyan (C) direction | −4 | 1 | 1 |
| magenta (M) direction | 3 | −2 | −2 |
| yellow (Y) direction | 1 | 1 | −4 |

IMAGE EDITING DEVICE

CROSS-REFERENCE TO RELATED APPLICATIONS

The present application claims priority upon Japanese Patent Application No. 2006-41468 filed on Feb. 17, 2006, Japanese Patent Application No. 2006-42750 filed on Feb. 20, 2006, and Japanese Patent Application No. 2006-45811 filed on Feb. 22, 2006, which are herein incorporated by reference.

BACKGROUND

1. Technical Field

The present invention relates to image editing devices.

2. Related Art

Various image reading devices such as image scanners generally are connected to a so-called computer device such as a personal computer through a wired or a wireless connection and the like, and transmit an image that was read from an original document to the computer device as image data. The computer device receives the image data that have been transmitted from the image reading device and stores those data on a data memory device such as various memories or a hard disk drive. At this time, on the computer device the image data that have been sent from the image reading device are subjected to processing such as various adjustments.

Examples of adjustment processing that may be performed at this time include histogram adjustment for adjusting the contrast of the image and density correction for partially altering the expression of darkness and lightness in the image. These adjustments may by executed automatically, or executed by a user or the like, by various programs, such as a driver program of the image reading device or application program and the like that are installed on the computer device. In addition to this, various methods have been proposed for the adjustment methods, editing methods, and various adjustments and the like that are executed on the image that have been read by the image reading device.

However, when a user would like to adjust the image to a desired color tone, even if the adjustment methods, the editing methods, or the various adjustments such as the histogram adjustment or the density correction are available, the user is forced to select an appropriate adjustment method from among these and then, through trial and error, use that adjustment method to perform suitable adjustment in order to change to the desired color tone. Thus, the case where it is extremely difficult for the user to change to a desired color tone was common. In particular, this required an immense amount of work for the users who were not experienced in adjusting the color tone and the like.

In particular, each of the adjustments such as the histogram adjustment and the density correction that are performed here are generally executed in a predetermined order on the image from the image reading device. Specifically, for example, in one case the histogram adjustment is executed on the image from the image reading device and then density correction is executed, whereas conversely, in another case the density correction is executed initially and then the histogram adjustment is executed, and thus there are various orders in which the adjustments may be executed. For this reason, depending on the adjustment processing for adjustment that the user adopts, there were cases in which problems such as overflow occurred which prevented the information of the original image from being utilized fully, or caused the smooth gradation to be lost and the like.

Also, in the cases where the user wants to select a desired color when adjusting the color tone, it was not easy for the user to search for a desired color based on an existing color, and it was extremely difficult to adjust the color tone smoothly.

SUMMARY

An advantage of some aspects of the present invention is that it is possible for a user to easily adjust the color of an image to be edited.

According to a first aspect of the invention is an image editing device including:

an image display section on which an image to be edited is displayed;

an information obtaining section that obtains information regarding a pixel that has been arbitrarily designated by a user from the image that has been displayed on the image display section, and information regarding a desired color that has been designated by the user for the pixel; and a color adjustment section that adjusts a color of the overall image, in order to change a color of the pixel that has been designated by the user to the desired color, based on the information regarding the pixel and the information regarding the desired color, which have been obtained by the information obtaining section.

According to a second aspect of the invention is an image editing device including:

a first data conversion section that converts data of pixels configuring an image into first output data based on first setting information;

a second data conversion section that converts the first output data that has been converted by the first data conversion section into second output data based on second setting information; and a setting information change section that changes the first setting information when an attribute of the second output data for the pixel has been designated by a user.

According to a third aspect of the invention is an image editing device including:

an image display section on which an image to be edited is displayed;

an information obtaining section that obtains information regarding a pixel that has been arbitrarily designated by a user on the image that has been displayed on the image display section; and a palette display controller that displays an editing palette that has a first patch with a same color as the color of the pixel that has been designated by the user, and second patches of a plurality of types of colors each different in steps in at least one of hue and lightness from the color of the first patch, based on information regarding the pixel that has been obtained by the image obtaining section.

Other features of the present invention will be made clear through the present specification with reference to the accompanying drawings.

BRIEF DESCRIPTION OF THE DRAWINGS

The invention and its advantages will be understood more completely by reading the present specification with reference to the accompanying drawings.

FIG. 10A is an explanatory diagram of data that are set through the histogram adjustment.

FIG. 10B is an explanatory diagram of data that are set through the density correction.

FIG. 10C is an explanatory diagram of data that are set through the image adjustment.

Figure 1:
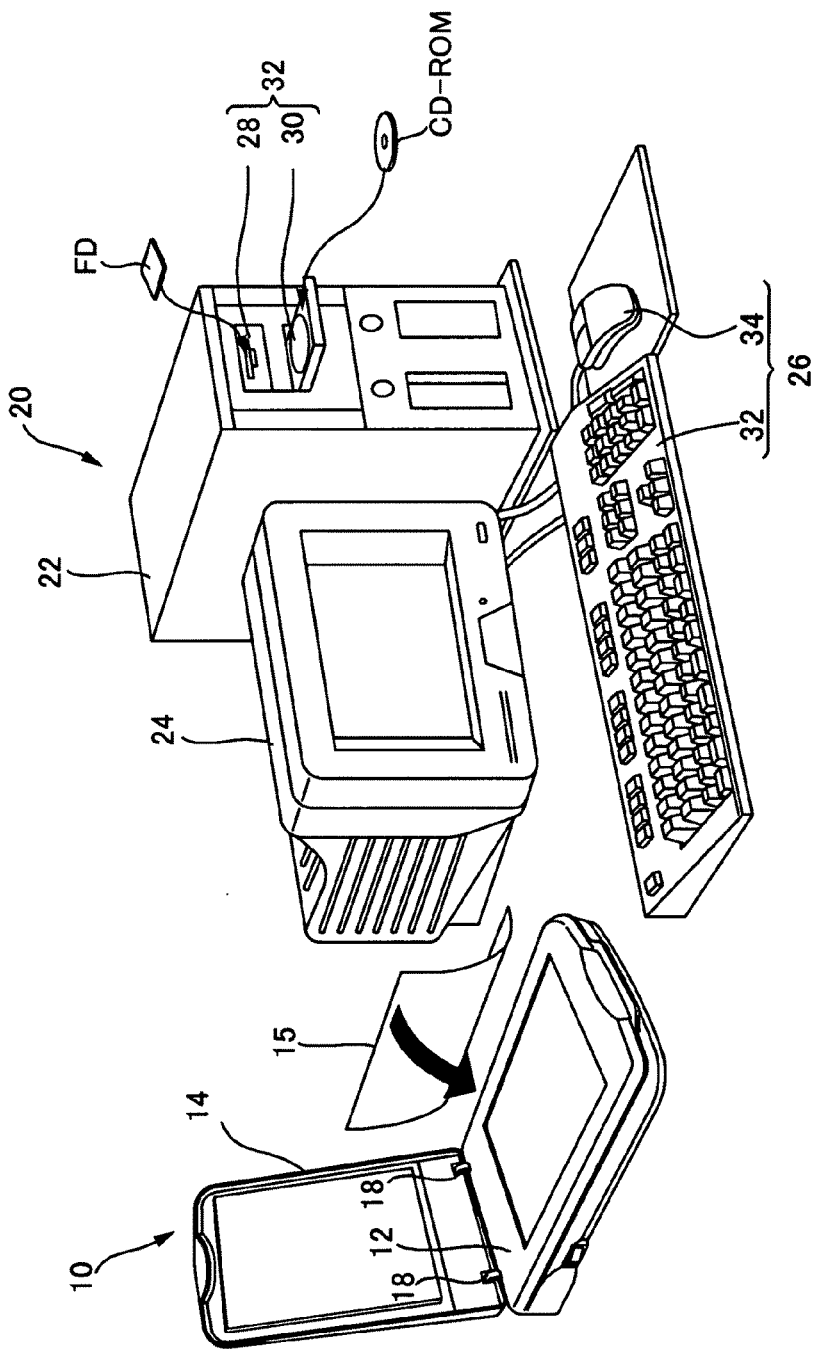
FIG. 1 is an explanatory diagram of an embodiment of an image reading system.

DESCRIPTION OF EXEMPLARY
EMBODIMENTS

At least the following matters will become clear through the description of the present specification and the accompanying drawings.

An image editing device includes:

an image display section on which an image to be edited is displayed;

an information obtaining section that obtains information regarding a pixel that has been arbitrarily designated by a user from the image that has been displayed on the image display section, and information regarding a desired color that has been designated by the user for the pixel; and a color adjustment section that adjusts a color of the overall image, in order to change a color of the pixel that has been designated by the user to the desired color, based on the information regarding the pixel and the information regarding the desired color, which have been obtained by the information obtaining section.

With this image editing device, the color adjustment section adjusts the color of the overall image, based on the information on a pixel that has been arbitrarily designated by a user from the image that is displayed on the image display section, and the information on a desired color that has been designated by the user for that pixel, in order to change a color of the pixel that has been designated by the user to the color desired by the user, and thus the user can edit images with ease.

With regard to such image editing device, it is preferable that the information regarding the pixel includes information regarding a position of the pixel on the image.

In this way, by having the information on the pixel include information of the position of the pixel on the image, the pixel that has been designated by the user can be easily specified.

With regard to such image editing device, it is preferable that at least one of the information on the pixel or the information on the desired color is obtained from the user through an operation input section.

If it is obtained from the user through the operation input section in this way, then at least one of the information on the pixel or the information on the desired color can be obtained with ease.

With regard to such image editing device, it is preferable that the desired color is designated by the user from among a plurality of types of patches each with different colors, which are provided on an editing palette that has been displayed on the image display section.

Thus, a desired color is designated by the user from a plurality of types of patches with different colors that are provided on the editing palette that is displayed on the image display section, and therefore the user can easily designate a desired color.

With regard to such image editing device, it is preferable that the editing palette is provided with, as the patch, patches of a plurality of types of colors each different in steps in at least one of hue and lightness from the color of the pixel that has been designated by the user.

In this way, if, the editing palette is provided with, as patches, patches of a plurality of types of color that differ in steps in at least one of their hue or lightness from the color of the pixel that has been designated by the user, then the user can easily designate a desired color.

With regard to this image editing device, it is preferable that the editing palette is provided with a patch whose color is the same as the color of the pixel that has been designated by the user.

In this way, if the editing palette is provided with a patch whose color is the same as the color of the pixel that has been designated by the user, then the user can more easily designate a desired color.

With regard to this image editing device, it is preferable that the color adjustment section adjusts the color of the overall image by changing the color of each of the pixels configuring the image.

In this way, the color of the overall image can be adjusted with ease by having the color adjustment section change the color of each of the pixels configuring the image.

With regard to such image editing device, it is preferable that the color adjustment section executes a computation for changing the pixel that has been designated by the user to the desired color, and, based on the results of that computation, adjusts the color of the overall image.

In this way, by having the color adjustment section execute a computation for changing the pixel that has been designated by the user to the desired color, the color of the overall image can be easily adjusted based on the results of that computation.

With regard to such image editing device, it is preferable that the color adjustment section references setting information from the user before adjusting the overall color of the image.

In this way, by having the color adjustment section adjust the overall color of the image, it is possible to perform adjustment that reflects the setting information from the user.

With regard to such image editing device, it is preferable that the image editing device is provided with a first data conversion section that converts data of pixels configuring an image that serves as the basis for the image to be edited into first output data based on first setting information, a second data conversion section that converts the first output data that have been converted by the first data conversion section into second output data based on second setting information, and an image display controller that displays the image to be edited on the image display section based on the second output data that have been converted by the second data conversion section, and also the image adjustment section changes the first setting information in order to change a color of the pixel that has been designated by the user to the desired color.

By providing such first data conversion section and second data conversion section, and having the color adjustment section change the first setting information so as to change a color of the pixel that has been designated by the user to a desired color, it is possible to smoothly change the data of the pixels configuring the image that serves as the basis for the image to be edited into the second output data, even when the color adjustment section has adjusted the color of the overall image.

It is also possible to achieve an image editing method as the following.

An image editing method that includes the following:

obtaining information on a pixel that has been arbitrarily designated by a user from the image that is displayed on the image display section, and information on a desired color that has been designated by the user for that pixel; and adjusting the color of the overall image, in order to change a color of the pixel that has been designated by the user to the desired color, based on the information on the pixel and the information on the desired color.

With this image editing method, the overall color of the image is adjusted based on the information on the pixel that has been arbitrarily designated by a user from the image that is displayed on the image display section, and the information on a desired color that has been designated by the user for that pixel, in order to change a color of the pixel that has been designated by the user to the color desired by the user, and thus the user can edit images with ease.

It is also possible to achieve a computer-readable medium such as follows.

A computer-readable medium for activating the image editing device, which includes the following codes:

a code for displaying an image to be edited on the image display section;

a code for obtaining information on a pixel that has been arbitrarily designated by a user from the image that is displayed on the image display section, and information on a desired color that has been designated by the user for that pixel; and a code for adjusting the color of the overall image, in order to change a color of the pixel that has been designated by the user to the desired color, based on the information on the pixel that has been obtained and the information on the desired color.

With this computer-readable medium, the overall color of the image is adjusted based on the information on the pixel that has been arbitrarily designated by a user from the image that is displayed on the image display section, and the information on a desired color that has been designated by the user for that pixel, in order to change a color of the pixel that has been designated by the user to the color desired by the user, and thus the user can edit images with ease.

It is also possible to achieve an image reading system such as follows.

An image reading system that includes:

an image reading section that reads an image from an original document;

an image display section on which the image that has been read by the image reading section is displayed as an object to be edited;

an information obtaining section that obtains information on a pixel that has been arbitrarily designated by a user from the image that is displayed on the image display section, and information on a desired color that has been designated by the user for that pixel; and a color adjustment section that adjusts the color of the overall image, in order to change a color of the pixel that has been designated by the user to the desired color, based on the information on the pixel and the information on the desired color, which have been obtained by the information obtaining section.

With this image reading system, the overall color of the image is adjusted based on the information on the pixel that has been arbitrarily designated by a user from the image that is displayed on the image display section, and the information on a desired color that has been designated by the user for that pixel, in order to change a color of the pixel that has been designated by the user to the color desired by the user, and thus the user can edit images with ease.

It is also possible to achieve an image editing device such as follows.

An image editing device that includes:

a first data conversion section that converts data of pixels configuring an image into first output data based on first setting information;

a second data conversion section that converts the first output data that has been converted by the first data conversion section into second output data based on second setting information; and a setting information change section that changes the first setting information when an attribute of the second output data for the pixel has been designated by a user.

With this image editing device, by having the setting information change section change the first setting information that is referenced when the first data conversion section converts the data of the pixels configuring the image into first output data, when an attribute of the second output data has been designated by a user, it is possible to inhibit the occurrence of problems such as overflow.

With regard to this image editing device, it is preferable that the second setting information is retained as is when the attribute of the second output data for the pixel has been designated by the user.

In this way, by retaining the second setting information as it is, it is possible to prevent the occurrence of problems such as an overflow.

With regard to this image editing device, it is preferable that when the attribute of the second output data for a pixel configuring the image has been designated by the user, the setting information change section changes the first setting information so that the attribute of the second output data for the pixel becomes the attribute that has been designated by the user.

In this way, when an attribute of the second output data for the pixels configuring the image has been designated by the user, by having the setting information change section change the first setting information such that an attribute of the second output data for the pixel becomes the attribute that has been designated by the user, it is possible to perform adjustment such that problems such as overflow are kept from occurring and the attribute of the second output data becomes the attribute that has been designated by the user.

With regard to this image editing device, it is preferable that the data of the pixel is data of each RGB color of the pixel.

If the data of the pixel are the RGB color data of the pixel, then it is possible to prevent problems such as the overflow from occurring.

With regard to this image editing device, it is preferable that the first data conversion section converts the data of all of the pixels configuring the image into the first output data.

In this way, by having the first data conversion section convert the data of all of the pixels configuring the image into the first output data, it is possible to perform adjustment of the entire image.

With regard to this image editing device, it is preferable that the first data conversion section and the second data conversion section perform conversion to the first output data and the second output data, respectively, each time the attribute of the second output data for the pixel is designated by the user.

In this way, by having the first data conversion section and the second data conversion section perform conversion to the first output data and the second output data each time an attribute of the second output data for the pixel is designated by the user, latest second output data can be obtained sequentially.

With regard to this image editing device, it is preferable that the first setting information can be set by the user.

In this way, by making it possible for the first setting information to be changed by the user, it is possible to convert the first output data based on the first setting information that has been changed by the user.

With regard to this image editing device, it is preferable that the second setting information can be set by the user.

In this way, by making it possible for the second setting information to be changed by the user, it is possible to convert the second output data based on the second setting information that has been changed by the user.

With regard to this image editing device, it is preferable that the pixel for which the attribute of the second output data has been designated by the user is a single pixel from among a plurality of the pixels configuring the image.

In this way, by having the pixel for which the attribute of the second output data has been designated by the user being a single pixel from among a plurality of the pixels that configure the image, it is possible to prevent problems such as overflow from occurring.

With regard to such image editing device, it is preferable that the designation of an attribute of the second output data that is made by the user is performed through an operation input section.

In this way, by having the designation of an attribute of the second output data that is made by the user be performed through the operation input section, the information of the attribute of the second output data that has been designated by the user can be obtained with ease.

With regard to such image editing device, it is preferable that designation of the attribute of the second output data by the user is carried out by designating a color for the pixel.

In such a case where the designation of an attribute of the second output data by the user is made by designating a color for the pixel configuring the image, it is possible to inhibit the occurrence of problems such as overflow.

With regard to this image editing device, it is preferable that it is further provided with an image display section on which the image that has been created based on the second output data is displayed.

In this way, by providing such image display section, the image that has been created based on the second output data can be displayed with ease.

It is also possible to achieve an image editing method such as follows.

An image editing method that includes the following:

converting the data of the pixels configuring an image into first output data based on first setting information;

converting the first output data that have been converted into second output data based on second setting information; and changing the first setting information when an attribute of the second output data for the pixel has been designated by a user.

With this image editing method, by changing the first setting information that is referenced when the data of the pixels configuring the image are converted into the first output data, when an attribute of the second output data for the pixel has been designated by a user, it is possible to inhibit the occurrence of problems such as overflow.

It is also possible to achieve a computer-readable medium such as follows.

A computer-readable medium for activating an image editing device, which includes the following codes:

a code for converting the data of the pixels configuring an image into first output data based on first setting information;

a code for converting the first output data that have been converted into second output data based on second setting information; and a code for changing the first setting information when an attribute of the second output data for the pixel has been designated by a user.

With this computer-readable medium, by changing the first setting information that is referenced when the data of the pixels configuring the image are converted into the first output data, when an attribute of the second output data for the pixel has been designated by a user, it is possible to inhibit the occurrence of problems such as an overflow.

It is also possible to achieve an image reading system such as follows.

An image reading system that includes:

an image reading section that reads an image from an original document;

a first data conversion section that converts data of pixels configuring an image that has been read by the image reading section into first output data based on first setting information;

a second data conversion section that converts the first output data that have been converted by the first data conversion section into second output data based on second setting information; and a setting information change section that changes the first setting information when an attribute of the second output data for the pixel has been designated by a user.

With this image reading system, by changing the first setting information that is referenced when the data of the pixels making up the image are converted into the first output data, when an attribute of the second output data for the pixel has been designated by a user, it is possible to inhibit the occurrence of problems such as an overflow.

It is also possible to achieve an image reading method such as the follows.

An image reading method that includes the following:

reading an image from an original document;

converting the data of the pixels making up the image that has been read into first output data based on first setting information;

converting the first output data that have been converted into second output data based on second setting information; and changing the first setting information when an attribute of the second output data for the pixel has been designated by a user.

With this image reading method, by changing the first setting information that is referenced when the data of the pixels making up the image are converted into the first output data, when an attribute of the second output data for the pixel has been designated by a user, it is possible to inhibit the occurrence of problems such as an overflow.

It is also possible to achieve an image editing device such as follows.

An image editing device that includes:

an image display section on which an image to be edited is displayed;

an information obtaining section that obtains information regarding a pixel that has been arbitrarily designated by a user on the image that has been displayed on the image display section; and a palette display controller that displays an editing palette that has a first patch with a same color as the color of the pixel that has been designated by the user, and second patches of a plurality of types of colors each different in steps in at least one of hue and lightness from the color of the first patch, based on information regarding the pixel that has been obtained by the image obtaining section.

With this image editing device, the editing palette that has the first patch with the same color as the color of the pixel that has been arbitrarily designated by the user, and second patches of a plurality of types of color that differ in steps in at least one of their hue or lightness from the color of the first patch, is displayed, and thus the user can easily search for a desired color.

With this image editing device, it is preferable that the second patches of the plurality of types of color are disposed on the editing palette adjacent to one another.

In this way, by having the second patches of the plurality of types of color be disposed on the editing palette adjacent to one another, the colors of the second patches can be compared to one another with ease.

In this image editing device, it is preferable that the first patch, adjacent to at least one of the second patches of a plurality of the types of colors, is disposed on the editing palette.

By having the first patch being disposed on the editing palette adjacent to at least one of the second patches of a plurality of the types of color in this way, the colors of the first patch and the second patches can be easily compared.

In this image editing device, it is preferable that the editing palette is provided with, as the second patches, a plurality of types of patches each different in steps in the hue from the color of the first patch, a plurality of the types of the patches having an equal lightness to one another.

In this way, by providing a plurality of types of patches as the second patches whose hue changes in steps from the color of the first patch, and setting them so that a plurality of the types of patches have equal lightness to one another, the user can more easily search for a desired color.

In such image editing device, it is preferable that an amount of change in the hue of the second patches with respect to the color of the first patch differs depending on the lightness of the first patch.

By having the amount of change in the hue of the second patches with respect to the color of the first patch differ depending on the lightness of the first patch in this way, the user can more easily search for a desired color.

In such image editing device, it is preferable that there are different amounts of change in the hue between the second patches of a plurality of the types of colors, each different in steps in the hue from the color of the first patch.

By having different amounts of change in the hue between the second patches of a plurality of the types of colors, whose hue differs in steps from the color of the first patch in this way, the user can more easily search for a desired color.

In this image editing device, it is preferable that the second patches of a plurality of the types of colors, each different in steps in the hue from the color of the first patch, are disposed surrounding the first patch in the center.

In this way, by disposing the second patches around the first patch in the center, the colors of the first patch and the second patches can be easily compared, and thus the user can more easily search for a desired color.

In such image editing device, it is preferable that the editing palette is provided with a plurality of types of patches, as the second patches, whose lightness changes in steps from the color of the first patch, and the plurality of types of patches are set so as to have an equal hue to one another.

In this way, by providing a plurality of types of patches each with different lightness in steps from the color of the first patch, as the second patches, and setting them so that the plurality of types of patches have an equal hue to one another, the user can more easily search for a desired color.

In such image editing device, it is preferable that the second patches of a plurality of the types of colors, each with different lightness in steps from the color of the first patch, are disposed in a straight line with the first patch in the center.

In this way, by disposing the second patches of a plurality of the types of colors, each with different lightness in steps from the color of the first patch, in a straight line with the first patch in the center, the user can easily search for a desired color from a plurality of second patches.

In such image editing device, it is preferable that the editing palette is provided with patches whose hue differs in steps respectively in each direction of the colors cyan, magenta, yellow, red, green, and blue, with respect to the color of the first patch, as the second patches.

In this way, by providing patches whose hue differs in steps respectively in each direction of the colors cyan, magenta, yellow, red, green, and blue, with respect to the color of the first patch, as the second patches, the user can easily search for a desired color.

In this image editing device, it is preferable that the editing palette is provided with patches with different hues in two color directions selected from cyan, magenta, yellow, red, green, and blue, with respect to the color of the first patch, as the second patches.

In this way, by providing patches with different hues in two color directions selected from the cyan, magenta, yellow, red, green, and blue, as the second patches, the user can more easily search for a desired color.

In such image editing device, it is preferable that the editing palette is provided with a color save region for storing the color of patches that have been designated by the user from among the second patches of a plurality of the types of colors.

In this way, by providing the editing palette with a color save region for storing the color of patches that have been designated by the user from the second patches of a plurality of the types of color, the user can easily store a desired color.

In such image editing device, it is preferable that the colors of a plurality of types of the patches that have been designated by the user can be stored in the color save region.

In this way, by making it possible for the color of a plurality of types of the patches that have been designated by the user to be stored in the color save region, the user can store a plurality of types of desired colors.

In such image editing device, it is preferable that when the user has selected one from among the second patches of a plurality of the types of colors, the palette display controller displays the editing palette with a patch having the color of the patch that has been selected serving as the first patch.

In this way, when the user has selected one of the second patches of a plurality of the types of colors, by having the palette display controller display the editing palette with a patch having the color of the patch that has been selected serving as the first patch, the user can display second patches of a plurality of types of colors different in steps in at least one of their hue or their lightness from the color of the first patch, with the desired color of the user serving as the color of the first patch. Thus, the desired color can be searched more easily.

In such image editing device, it is preferable that the palette display controller displays the editing palette on the image display section.

In this way, by having the palette display controller display the editing palette on the image display section, the editing palette can be displayed correlated with the image to be edited.

It is also possible to achieve an image editing method such as follows.

An image editing method that includes the following:

obtaining information on a pixel that has been arbitrarily designated by a user on the image that is displayed on an image display section; and displaying an editing palette that has a first patch of the same color as the color of the pixel that has been designated by the user, and second patches of a plurality of the types of colors that differ in steps in at least one of their hue or lightness from the color of the first patch, based on information on the pixel that has been obtained.

With this image editing method, the editing palette that has the first patch with the same color as the color of the pixel that has been arbitrarily designated by the user, and the second patches of a plurality of types of color that differ in steps in at least one of their hue or lightness from the color of the first patch, is displayed, and thus the user can easily search for a desired color.

It is also possible to achieve a computer-readable medium such as follows.

A computer-readable medium for activating an image editing device, which includes the following codes:

a code for obtaining information on a pixel that has been arbitrarily designated by a user on the image that is displayed on an image display section; and a code for displaying an editing palette that has a first patch of the same color as the color of the pixel that has been designated by the user, and second patches of a plurality of types of colors that differ in steps in at least one of their hue or lightness from the color of the first patch, based on information on the pixel that has been obtained.

With this computer-readable medium, the editing palette that has the first patch with the same color as the color of the pixel that has been designated by the user, and the second patches of a plurality of types of colors that differ in steps in at least one of their hue or lightness from the color of the first patch, is displayed, and thus the user can easily search for a desired color.

It is also possible to achieve an image reading system such as follows.

An image reading system that includes:

an image reading section that reads an image from an original document;

an image display section on which the image that has been read by the image reading section is displayed;

an information obtaining section that obtains information on a pixel that has been arbitrarily designated by a user on the image that is displayed on the image display section; and a palette display controller that displays an editing palette that has a first patch of the same color as the color of the pixel that has been designated by the user, and second patches of a plurality of types of colors that differ in steps in at least one of their hue or lightness from the color of the first patch, based on information on the pixel that has been obtained by the image obtaining section.

With such image reading system, the editing palette that has the first patch with the same color as the color of the pixel that has been arbitrarily designated by the user, and the second patches of a plurality of types of colors that differ in steps in at least one of their hue or lightness from the color of the first patch, is displayed, and thus the user can easily search for a desired color.

It is also possible to achieve an image reading method such as follows.

An image reading method that includes:

reading an image from an original document;

displaying the image that has been read on an image display section;

obtaining information on a pixel that has been arbitrarily designated by a user on the image that is displayed on the image display section; and displaying an editing palette that has a first patch of the same color as the color of the pixel that has been designated by the user, and second patches of a plurality of types of colors that differ in steps in at least one of their hue or lightness from the color of the first patch, based on information on the pixel that has been obtained.

With such image reading method, the editing palette that has the first patch with the same color as the color of the pixel that has been designated by the user, and the second patches of a plurality of types of colors that differ in steps in at least one of their hue or lightness from the color of the first patch, is displayed, and thus the user can easily search for a desired color.

Overview of the Image Reading System

Figure 2:
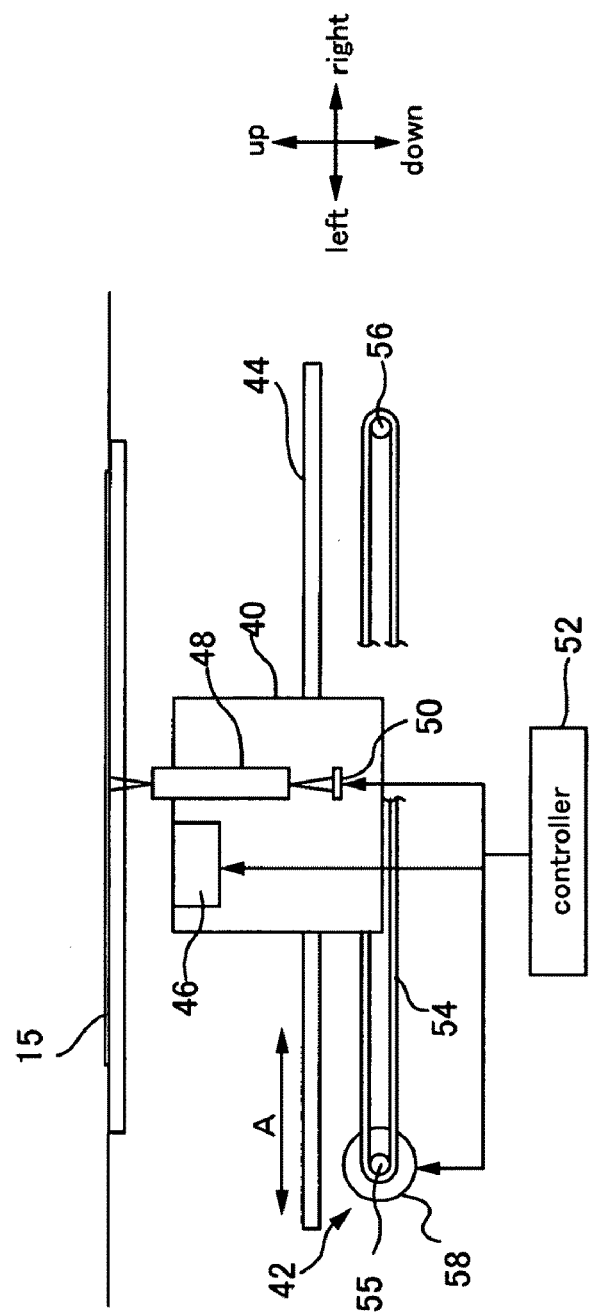
FIG. 2 is an explanatory diagram of an example of an internal configuration of an image reading device.
Figure 3:
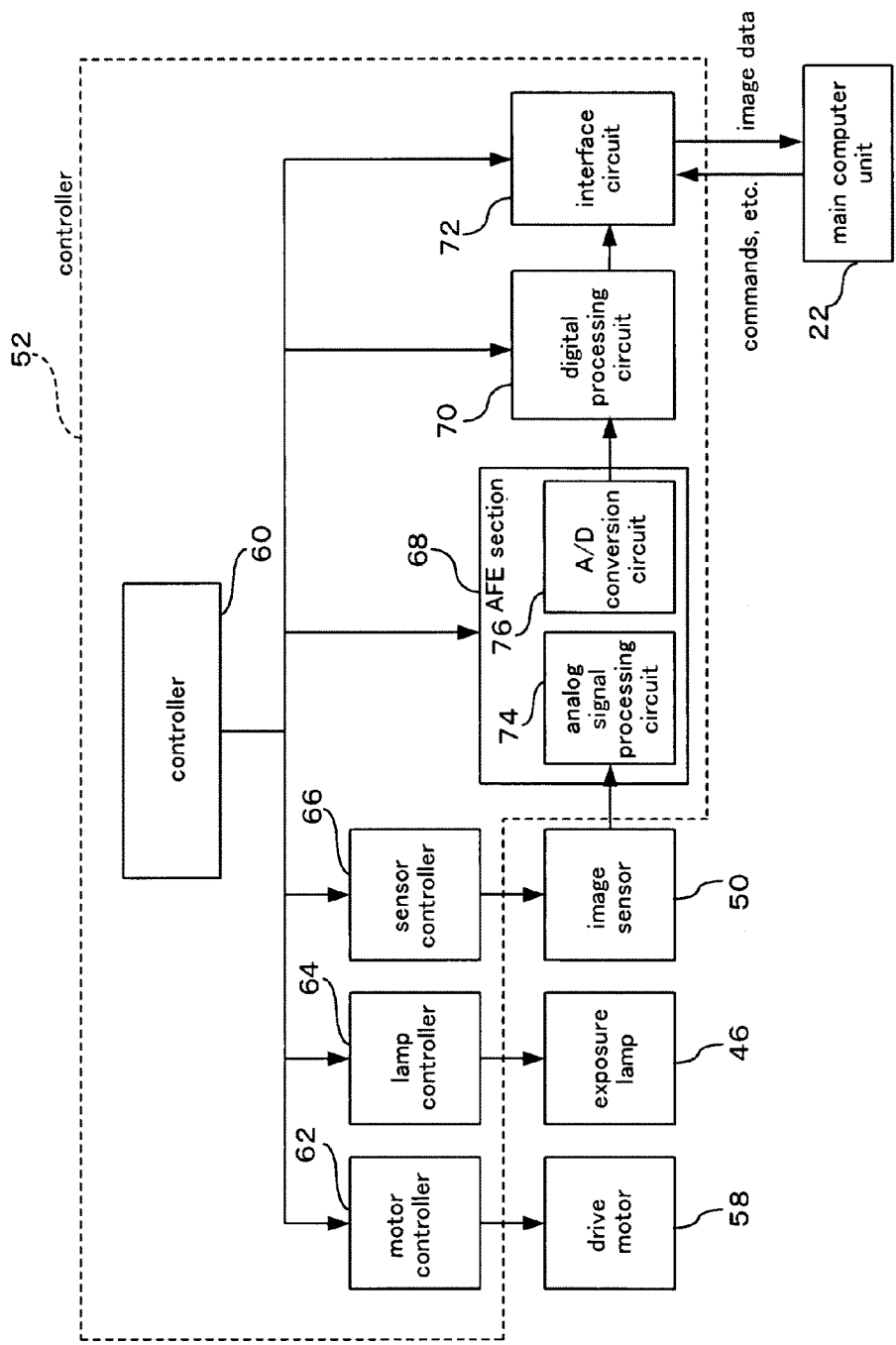
FIG. 3 is an explanatory diagram of an example of a system configuration of the image reading device.
Figure 4:
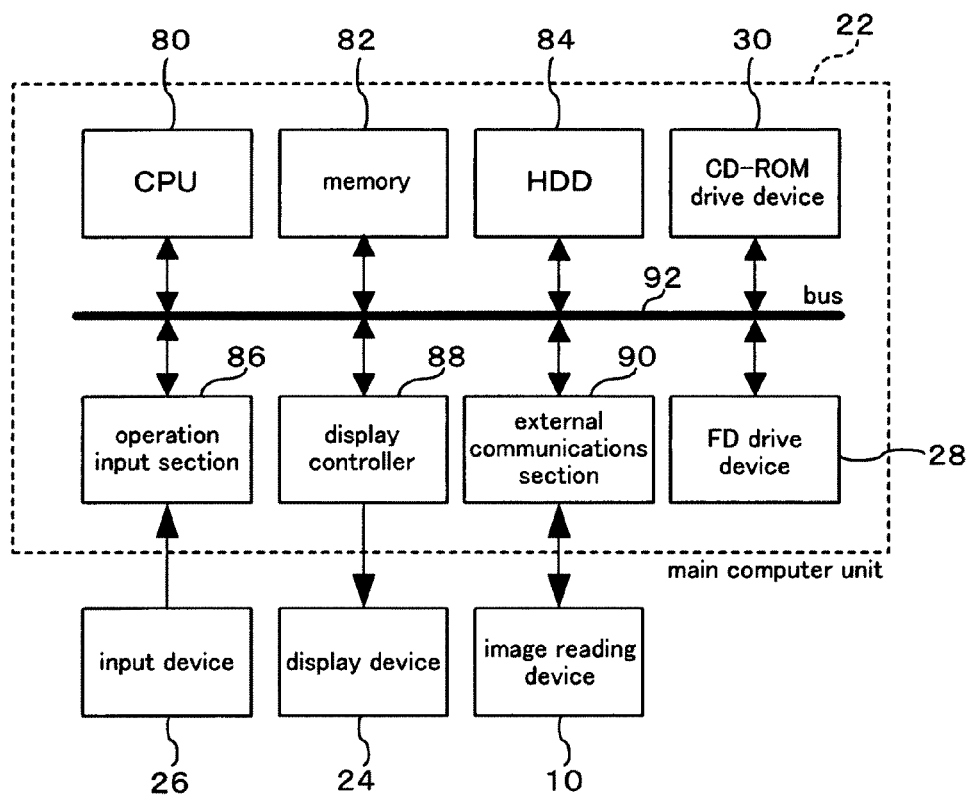
FIG. 4 is an explanatory diagram of an example of the system configuration of a main computer unit.

An embodiment of the image reading system, etc., according to the present invention is described below. FIGS. 1 through 4 are diagrams for describing an embodiment of the image reading system. FIG. 1 describes an embodiment of the image reading system. FIG. 2 is a diagram describing an example of the internal structure of an image reading device. FIG. 3 is a diagram describing an example of the system configuration of the image reading device. FIG. 4 is a diagram describing the system configuration of a computer device.

As shown in FIG. 1, an image reading system 2 has an image reading device 10 and a computer device 20 that is communicably connected to the image reading device 10 through a wired or a wireless connection. The image reading device 10, as shown in FIG. 1, is a device generally referred to as a scanner, and is provided with an original document platen 12 and an original document platen cover 14 that opens and closes the upper surface portion of the original document platen 12. An original document 15 whose image is to be read is set on the original document platen 12. The original document plate cover 14 is provided at the rear end portion of the original document platen 12 in such a manner that it can open and close about hinge sections 18.

On the other hand, as shown in FIG. 1, the computer device 20 is for example provided with a main computer unit 22, a display device 24, and an input device 26. The main computer unit 22 is constituted by any of various types of computers such as a personal computer. Here, a reading device 32 such as a FD drive device 28 or a CD-ROM drive device 30 is provided in the main computer unit 22. It is also possible for the main computer unit 22 to be provided with a MO (Magnet Optical) disk drive device or a DVD drive device as well. The display device 24 is constituted by any one of various display devices, including CRT displays, plasma displays, and liquid crystal displays. The input device 26 is constituted by a keyboard 34 and a mouse 36, for example.

It should be noted that here the display device 24 corresponds to the "image display section." The input device 26, such as the keyboard 34 and the mouse 36, corresponds to the "operation input section."

Image Reading Device

As shown in FIG. 2, within the original document platen 12 of the image reading device 10 are provided a carriage 40, a drive mechanism 42 that moves the carriage 40 parallel to direction of the arrow A in the drawing while keeping it a predetermined distance from the original document platen 12, and a guide 44 for supporting the carriage 40 while guiding its movement.

The carriage 40 is provided with an exposure lamp 46 that serves as a light source for irradiating light onto the original document 15 through the original document platen 12, a lens 48 on which the reflection light that has been reflected by the original document 15 is incident, and an image sensor 50 that is incorporated into the carriage 40 and that receives the reflection light through the lens 48. The image sensor 50 is constituted by, for example, a linear CCD sensor in which photoelectric conversion elements such as photodiodes for converting light signals into electrical signals are disposed in rows. The data of the image that is read by the image sensor 50 are output to a controller 52.

The drive mechanism 42 is provided with a timing belt 54 that is connected to the carriage 40, a pair of pulleys 55 and 56 between which the timing belt 54 is engaged, and a drive motor 58 for rotatively driving the one pulley 55. The driving of the drive motor 58 is controlled by control signals from the controller 52.

As shown in FIG. 3, the controller 52 is provided with a controller 60, a motor controller 62, a lamp controller 64, a sensor controller 66, an AFE (Analog Front End) section 68, a digital processing circuit 70, and an interface circuit 72. The AFE (Analog Front End) section 68 is provided with an analog signal processing circuit 74 and an A/D conversion circuit 76.

The controller 60 controls the motor controller 62 and the lamp controller 64, the sensor controller 66, the AFE (Analog Front End) section 68, the digital processing circuit 70, and the interface circuit 72, based on commands from the main computer unit 22, for example. The motor controller 62 controls the driving of the drive motor 58 for moving the carriage 40 based on commands from the controller 60. The lamp controller 64 controls the emission of light by the exposure lamp 46. The sensor controller 66 performs control of the image sensor 50.

The analog signal processing circuit 74 of the AFE (Analog Front End) section 68 performs signal processing on the analog signals of the image that has been read by the image sensor 50. The A/D conversion circuit 76 of the AFE (Analog Front End) section 68 A/D converts the signal of the image that has been signal processed by the analog signal processing circuit 74 into a digital signal.

The digital processing circuit 70 executes digital signal processing on the digital signals that are sent from the A/D conversion circuit 76 of the AFE (Analog Front End) section 68. Here, specifically, various types of image processing is executed, including corrections such as shading correction. The digital signals on which digital signal processing has been executed are output to the outside, that is, here the main computer unit 22 that is connected to the image reading device 10, by the interface circuit 72 as data (image data) of the image that has been read from the original document 15. In addition to this, the interface circuit 72 receives commands from the main computer unit 22 to the image reading device 10, for example.

Main Computer Unit

As shown in FIG. 4, the main computer unit 22 is provided with a CPU 80, a memory 82, a HDD (hard disk drive device) 84, an operation input section 86, a display controller 88, an external communications section 90, and a bus 92. In addition to these, the main computer unit 22 is also provided with the CD-ROM drive device 30 and the FD drive device 28 described earlier. The CPU 80, the memory 82, the HDD (hard disk drive device) 84, the CD-ROM drive device 30, the FD drive device 28, the operation input section 86, the display controller 88, and the external communications section 90 are communicably connected to one another via the bus 92.

The CPU 80 carries out the overall control of the main computer unit 22. The memory 82 is for holding the programs that are executed by the CPU 80 and various types of data such as the working data that are used by those programs. The HDD (hard disk drive device) 84 stores not only the Operating System (OS) that is run on the CPU 80 but also various programs, such as various types of application programs and drivers, and various types of data such as image data. The operation input section 86 is connected to the input device 26, such as the keyboard 34 or the mouse 36, and through these input devices 26 it obtains information that has been input by the user. Here, the operation input section 86 corresponds to the "information obtaining section." The display controller 88 controls the images that are displayed on the screen of the display device 24, for example, based on commands from the CPU 80. It should be noted that here the display controller 88 corresponds to the "image display controller." The external communications section 90 is for performing communication between the various peripheral devices, such as the image reading device 10, connected to outside of the main computer unit 22.

The CPU 80 reads programs from the HDD (hard disk drive device) 84 and runs those programs under the Operating System (OS). The programs that are executed here are not only various application programs but also the various drivers for controlling the image reading device 10, the operation input section 86, and the display controller 88, for example.

The driver for controlling the image reading device 10 is generally called the scanner driver. The scanner driver is a program that is installed on the main computer unit 22 through various types of communications lines, such as the Internet, or by way of various types of storage media such as CD-ROM and floppy disk (FD). By installing the scanner driver on the main computer unit 22, the main computer unit 22 functions as a control device for controlling the image reading device 10.

Scanner Driver

Figure 5:
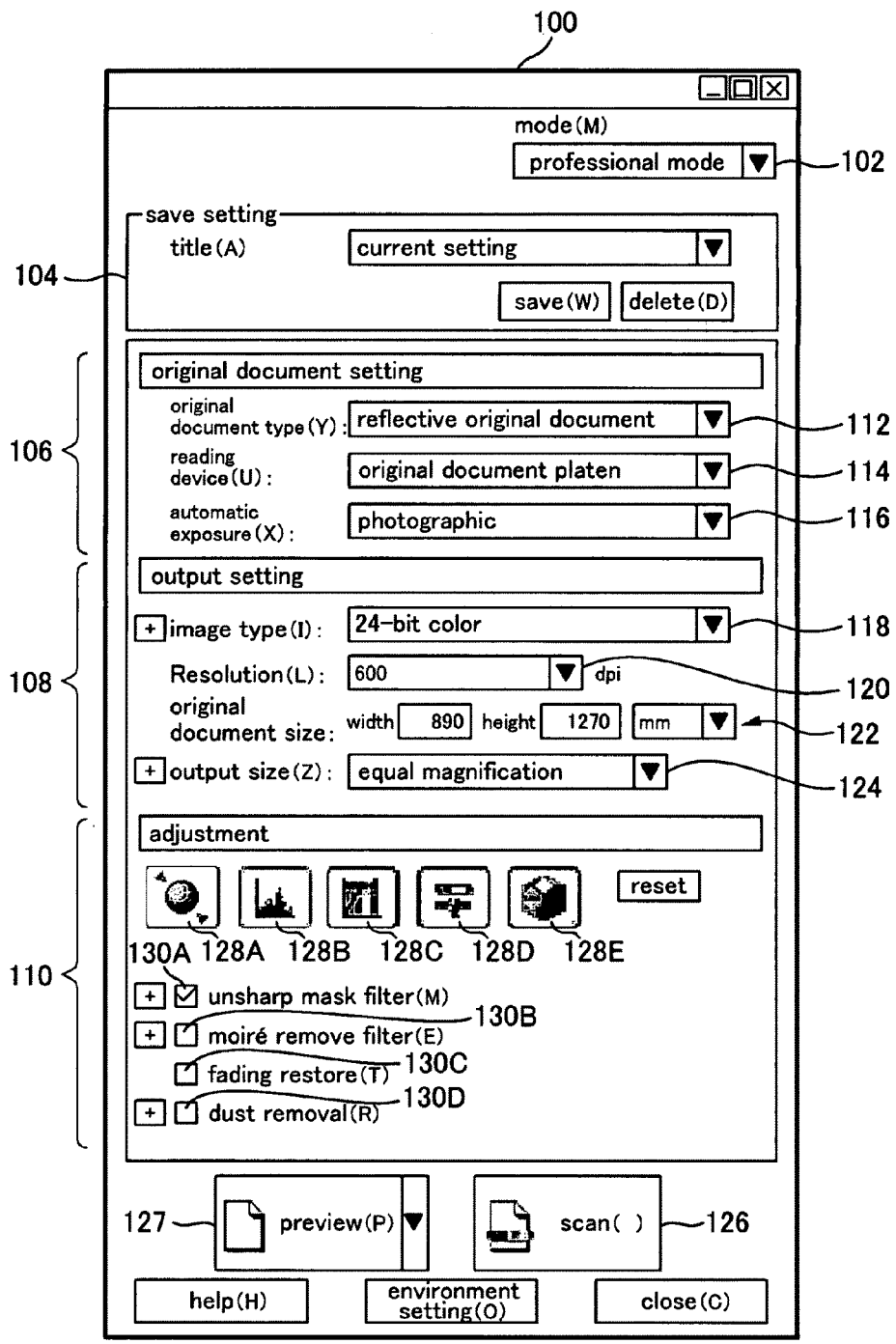
FIG. 5 is an explanatory diagram of an example of a main dialog box of a scanner driver.

An example of the user interface of the scanner driver is described next. FIG. 5 shows a main dialog box 100 of this user interface. This user interface is displayed on the display screen of the display device 24 by the CPU 80 of the main computer unit 22 through the display controller 88. While viewing the dialog box 100 of the user interface that is displayed on the display screen of the display device 24, the user can alter the various settings of the scanner driver using the input device 26, such as the keyboard 34 or the mouse 36.

The main dialog box 100 includes a "mode selection field" 102, a "save setting field" 104, an "original document setting field" 106, an "output setting field" 108, and an "adjustment field" 110. In the "mode selection field" 102 it is possible for the user to select one mode from among a plurality of mode types. Here, the "professional mode" has been selected. Also in the "save setting field" 104, the user can save or delete the current settings by clicking a "save button" or a "delete button."

In the "original document setting field" 106, the user can alter the settings for an "original document type" 112, a "reading device" 114, and an "automatic exposure" 116. In the "original document type" 112, it is possible to select the type of the original document that has been set. For example, it is possible to select a "reflective original document" or a "film", for example. In the "reading device" 114, it is possible to select an "original document platen", for example. In the "automatic exposure" 116, it is possible to change the exposure settings to those suited for the original document type to be read. For example, it is possible to select "for photographs" or "for paper documents", for example.

In the "output setting field" 108, the user can carry out various settings relating to the image output. Specifically, in the "output setting field" 108, it is possible to adjust the settings for an "image type" 118 of the output image, a "resolution" 120 when reading, an "original document size" 122 when reading, and an "output size" 124. In the "image type" 118, it is possible to make a selection for the number of colors of the read image from among the three options of color, grayscale, and monochrome. In the "resolution" 120, it is possible to adjust the setting of the resolution of the image that is read. In the "original document size" 122, it is possible to adjust the setting of the size of the image to be read.

The scanner driver controls the external image reading device 10 based on information that has been set by the user through the dialog box 100 when the user clicks the "scan button" 126 in the lower section of the dialog box 100, and reads the image from original document that has been set in the image reading device 10. The data of the image that has been read are sent to the main computer unit. When the user clicks a "preview button" 127 located in the lower section of the dialog box 100, the scanner driver displays a preview window for displaying the image that has been read by the image reading device 10 on the display screen of the display device 24.

Additionally, the scanner driver has the function of adjusting the image that has been read by the image reading device 10. Adjustment of the image that has been read is carried out through the "adjustment field" 110 of the main dialog box 100. The "adjustment field" 110 is provided with five buttons and four check boxes for adjusting the image that has been read by the image reading device 10. The five buttons 128A, 128B, 128C, 128D, and 128E are the automatic exposure button 128A, the histogram adjustment button 128B, the density correction button 128C, the image adjustment button 128D, and the color palette adjustment button 128E respectively. Also four check boxes 130A, 130B, 130C, and 130D are the check box 130A for an unsharp mask filter, the check box 130B for a moiré remove filter, the check box 130C for fading restore, and the check box 130D for dust removal respectively.

The automatic exposure button 128A is the button that is clicked when the user would like the exposure to be adjusted automatically. The histogram adjustment button 128B is the button that is clicked when the user would like to adjust the contrast of the image. A histogram adjustment dialog box is called up when the histogram adjustment button 128B has been clicked. The density correction button 128C is the button that is clicked when the user would like to correct the balance of the image darkness. A dialog box for density correction is called up when the density correction button 128C has been clicked. The image adjustment button 128D is the button that is clicked when the user wants to adjust the brightness, contrast, saturation, and color balance of the image. An dialog box for image adjustment is called up when the image adjustment button 128D is clicked. The color palette adjustment button 128E is the button that is clicked when the user wants to directly specify a color for a particular location in the image. A dialog box for color palette adjustment is called up when the color palette adjustment button 128E is clicked.

On the other hand, the check box 130A for the unsharp mask filter is the check box for specifying whether or not to use the unsharp mask filter, and is checked when the user wants to sharpen up the image. The check box 130B for the moiré remove filter is the check box for specifying whether or not to use a filter for removing moiré (checkered shading), which occurs when scanning the printed material, and is checked by the user when the moiré is noticeable. The check box 130C for fading restore is checked when the colors of a faded photograph are to be restored. The check box 130D for dust removal is checked when the user wants to reduce dust on the film during film scanning.

Image Adjustment

Figure 6:
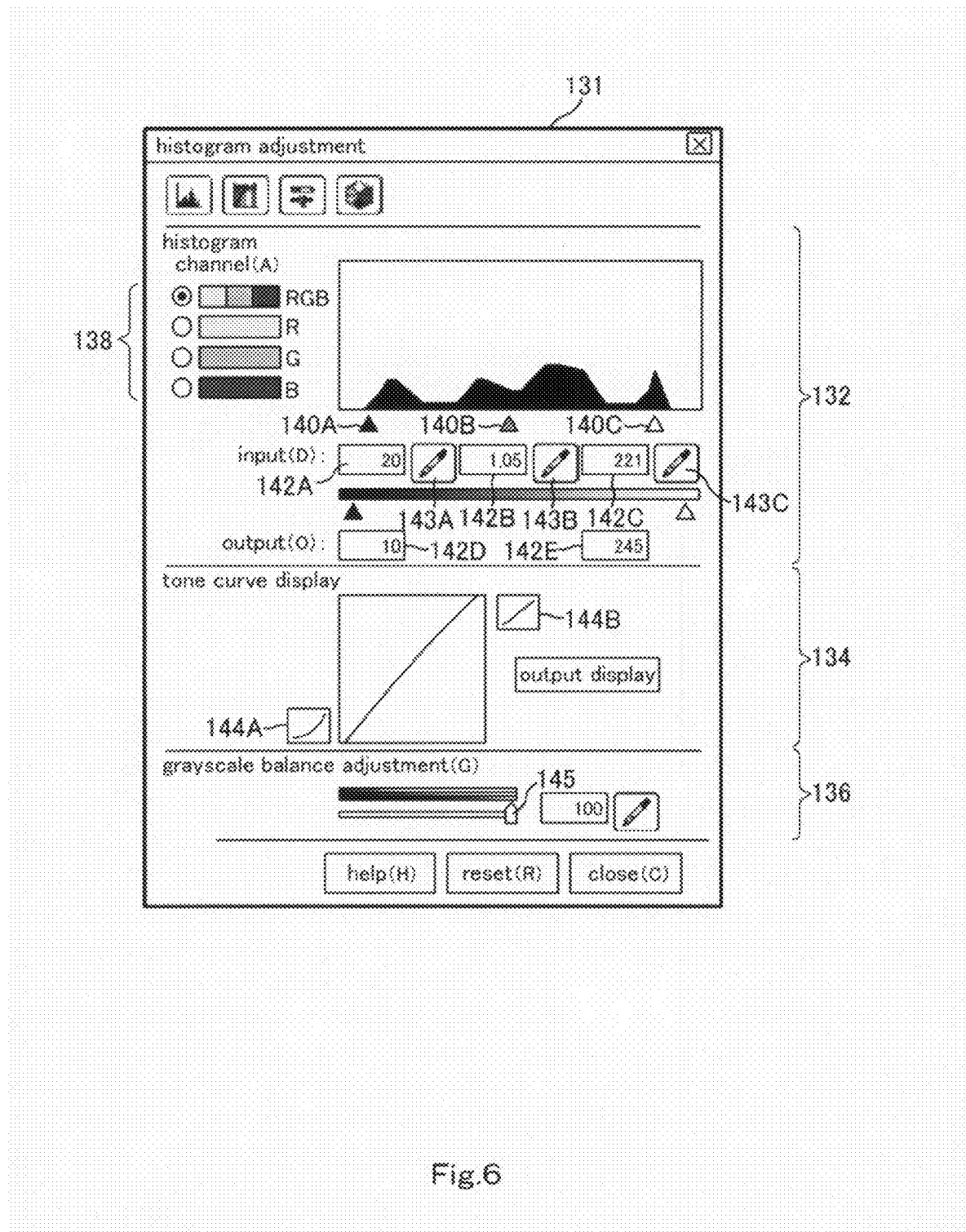
FIG. 6 is an explanatory diagram of an example of a histogram adjustment dialog box.
Figure 7:
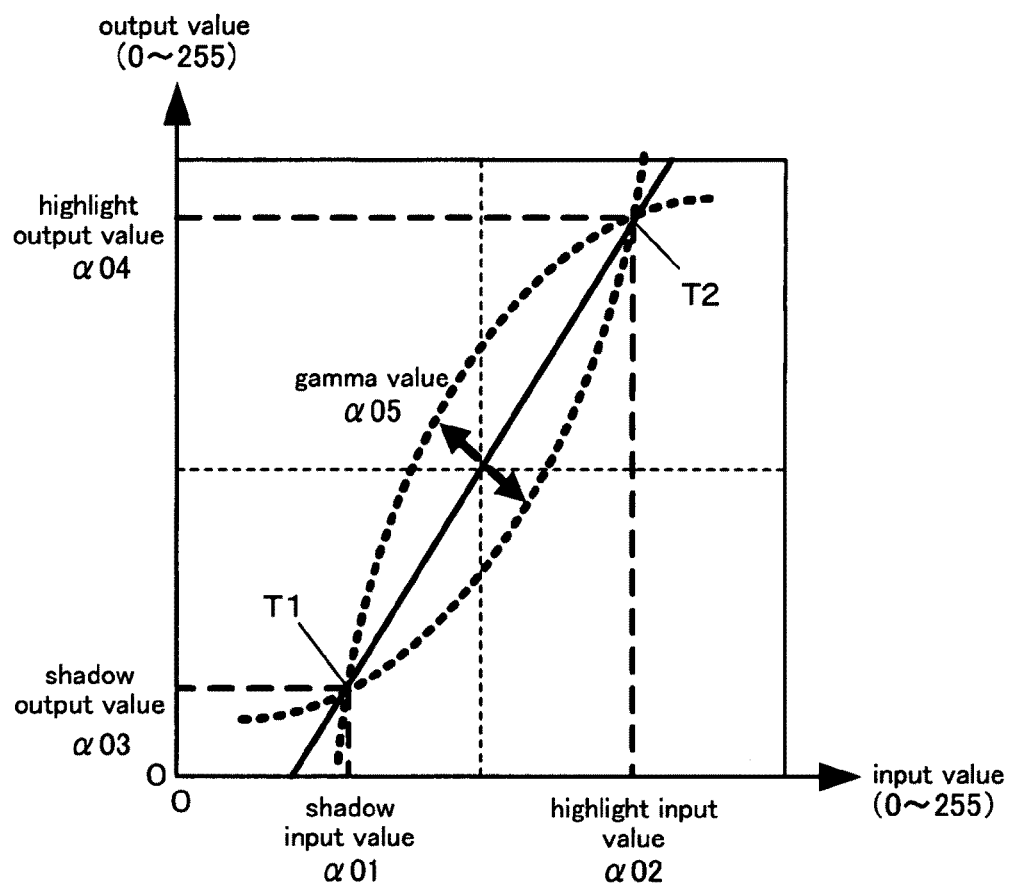
FIG. 7 is an explanatory diagram of a method for determining a tone curve.
Figure 8:
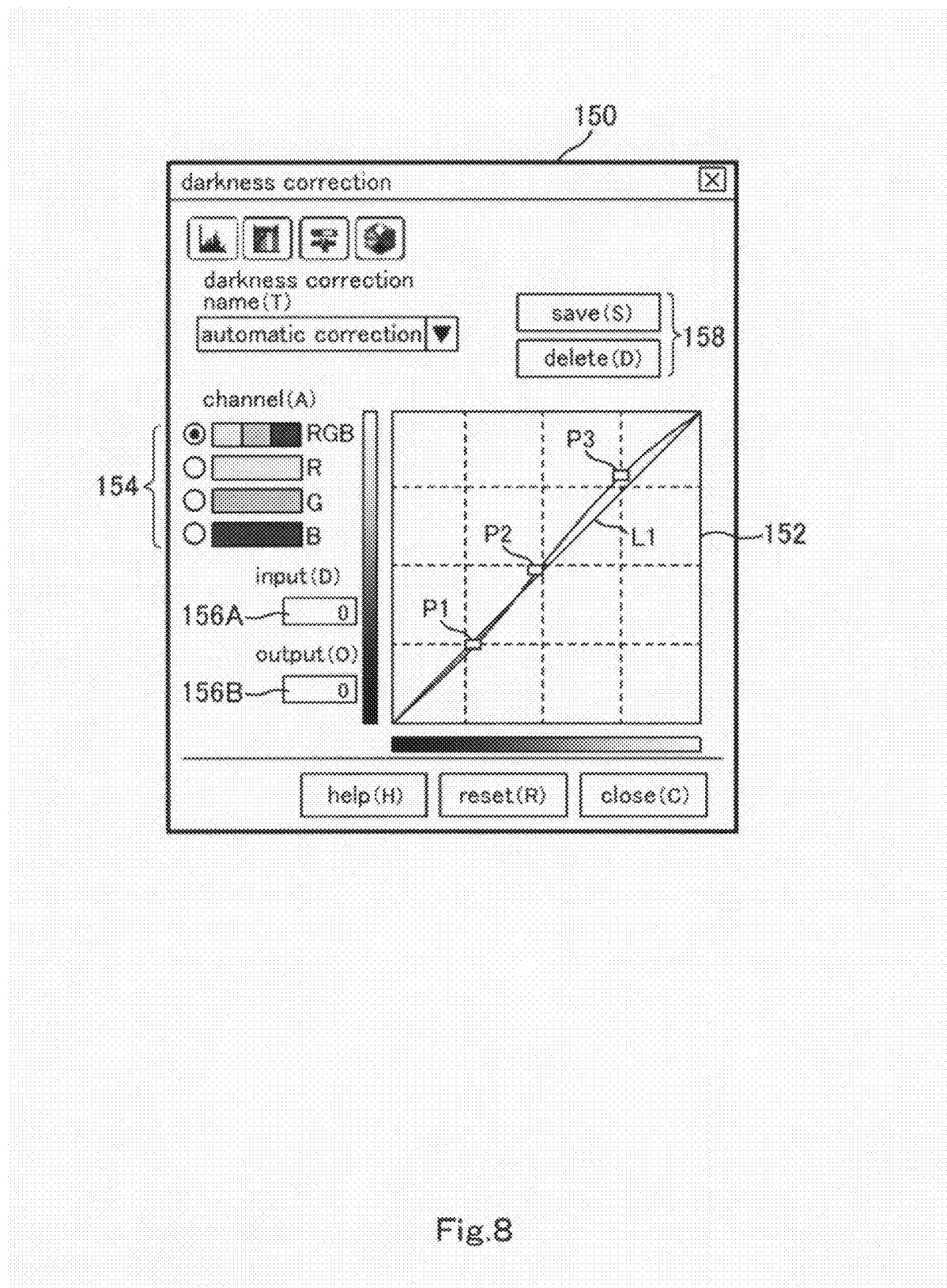
FIG. 8 is an explanatory diagram of an example of a density correction dialog box.
Figure 9:
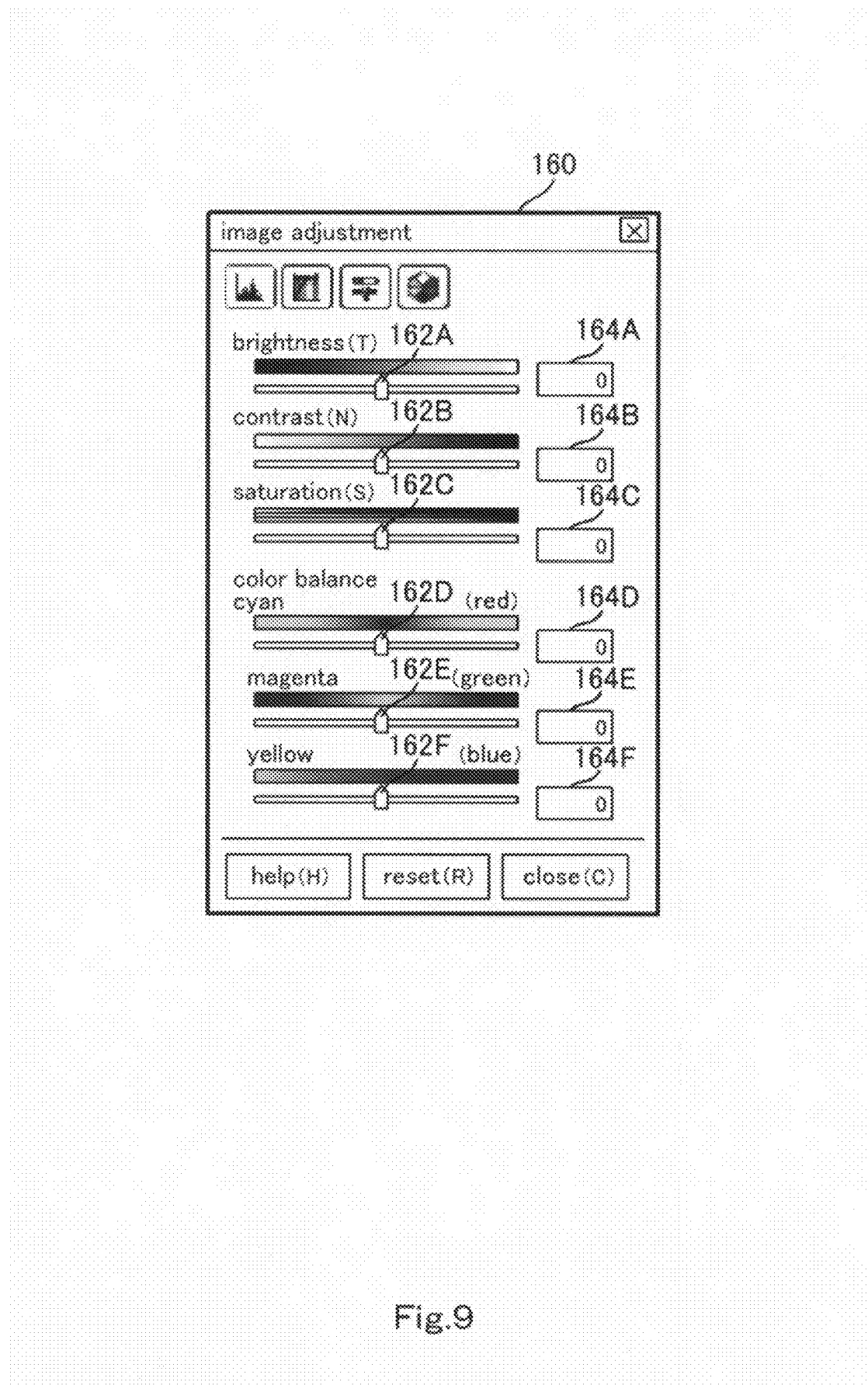
FIG. 9 is an explanatory diagram of an example of an image adjustment dialog box.

Next, a histogram adjustment, a density correction, and an image adjustment for adjusting the image are described. It should be noted that a color palette adjustment is described in detail later. FIGS. 6 through 9 are for describing the histogram adjustment, the density correction, and the image adjustment, respectively. FIG. 6 shows the dialog box for the histogram adjustment. FIG. 7 describes an overview of a specific adjustment through the histogram adjustment. FIG. 8 shows the dialog box for the density correction. FIG. 9 shows the dialog box for the image adjustment.

Histogram Adjustment

In the "histogram adjustment", the contrast of an image, for example, is adjusted so as to improve the appearance of the image that has been read. As shown in FIG. 6, a dialog box 131 for histogram adjustment is provided with a histogram display field 132 in which a histogram of the image to be edited is displayed, a tone curve display field 134 in which the tone curve that expresses the outcome of adjustment by the histogram is displayed, and a grayscale balance adjustment field 136 for adjusting the grayscale balance in order to exclude color fogging. Here, the "histogram" displays the distribution of the brightness and the color of the overall image, and expresses the data distribution of the image from black to white (pixel number) on a graph.

The histogram display field 132 is provided with a channel field 138 for selecting the type (channel (color)) of the histogram to be displayed. In the channel field 138, it is possible to select from among the four options of all RGB (red, green, blue) colors, R (red) only, G (green) only, and B (blue) only. When the user wants to adjust all the RGB (red, green, blue) colors, and selects the uppermost switch in the channel field 138, a histogram of all RGB (red, green, blue) colors is displayed on the right side. When the user wants to adjust R (red) only, and selects the second switch from the top of the channel field 138, a histogram of R (red) only is displayed on the right side. When the user wants to adjust G (green) only, and selects the third switch from the top of the channel field 138, a histogram of G (green) only is displayed on the right side. When the user wants to adjust B (blue) only, and selects the bottommost switch from the top of the channel field 138, a histogram of B (blue) only is displayed on the right side.

When adjusting the histogram that has been displayed, three sliders 140A, 140B, 140C that are provided below the histogram displayed are used for this adjustment. The three sliders 140A, 140B, 140C are the slider 140A for adjusting shadow, the slider 140B for adjusting gamma, and the slider 140C for adjusting highlight respectively. The slider 140A for adjusting the shadow is displayed by a solid black triangle. The slider 140B for adjusting gamma is displayed by a solid gray triangle. The slider 140C for adjusting highlighting is displayed by an empty triangle. When an adjustment is performed by using these three sliders 140A, 140B, and 140C, the three sliders 140A, 140B, 140C are respectively moved in the left and right direction independently. Specifically, the slider 140A for adjusting shadow is moved to a position slightly to the right side from the left end of the histogram peak. The slider 140C for adjusting highlighting is moved to a position slightly to the left side from the right end of the histogram peak. The slider 140B for adjusting gamma is moved to the left and right between the slider 140A for adjusting shadow and the slider 140C for adjusting highlighting so as to adjust the contrast of the intermediate section to an appropriate contrast. By doing this, the balance of the overall contrast of the image to be edited becomes good, and the appearance of the image can be improved.

The histogram display field 132 is also provided with numerical value input fields 142A, 142B, and 142C for independently and directly specifying with numerical values the positions of the three sliders 140A, 140B, and 140C, respectively. A shadow input value is input to the numerical value input field 142A. A gamma value is input to the numerical value input field 142B. A highlight input value is input to the numerical value input field 142C. Thus, the shadow input value, the highlight input value, and the gamma value can be easily specified by directly inputting the numerical values to each of the numerical value input fields 142A, 142B, and 142C.

To the right of these three numerical value input fields 142A, 142B, and 142C are provided pipette buttons 143A, 143B, and 143C respectively. These pipette buttons 143A, 143B, and 143C are buttons for directly specifying a point on the image to be edited that is displayed on the preview screen, which is displayed separately from the dialog box for histogram adjustment. Numerical values corresponding to a point (pixel) that has been designated on the image to be edited on the preview screen are directly input to the three numerical value input fields 142A, 142B, and 142C using these pipette buttons 143A, 143B, and 143C.

Further, below these two numerical value input fields 142A and 142C to which the shadow input value and the highlight input value are input, are provided two numerical value input fields 142D and 142E respectively. A shadow output value that corresponds to the shadow input value is input to the numerical value input field 142D on the left side. A highlight output value that corresponds to the highlight input value is input to the numerical value input field 142E on the right side.

There are four kinds of adjustment possibilities using these sliders 140A, 140B, and 140C and the numerical value input fields 142A, 142B, 142C, 142D, and 142E, and these are all RGB (red, green, blue) colors, R (red) only, G (green) only, and B (blue) respectively.

FIG. 7 describes this histogram adjustment in detail. In the histogram adjustment, the tone curve that expresses the correlation between the input data and the output data, such as shown in FIG. 7, is defined based on the shadow input value $\alpha 01$, the shadow output value $\alpha 03$, the highlight input value $\alpha 02$, the highlight output value $\alpha 04$, and the gamma value $\alpha 05$, which are set through the sliders 140A, 140B, and 140C or the numerical value input fields 142A, 142B, 142C, 142D, and 142E. In other words, the tone curve that is defined here is formed passing through a point T1 (also called a shadow point) defined by the shadow input value $\alpha 01$ and the shadow output value $\alpha 03$ that have been set and a point T2 (also called a highlight point) defined by the highlight input value $\alpha 02$ and the highlight output value $\alpha 04$ that have been set. Further, the tone curve is formed bulging toward either of one side of a straight line that connects these point T1 and point T2, in accordance with the gamma value $\alpha 05$ that has been set. Thus, the tone curve that expresses the correlation between the input data and the output data is defined based on the shadow input value $\alpha 01$, the shadow output value $\alpha 03$, the highlight input value $\alpha 02$, the highlight output value $\alpha 04$, and the gamma value $\alpha 05$ that have been set in this way. It should be noted that the tone curve is defined for each color of R (red), G (green), and B (blue) respectively.

The tone curve that has been defined in this way is displayed in the tone curve display field 134 as shown in FIG. 6. In the tone curve display field 134, the tone curve that corresponds to the outcome of the adjustment performed through the histogram display field 132 is displayed. The tone curve can be more finely tuned in the tone curve display field 134 by adjusting the gradation outside the point T1 (shadow point) or the point T2 (highlight point) Specifically, the user clicks on end portion curve shape change buttons 144A and 144B, which are provided at the lower left side and the upper right side of the tone curve respectively, and selects the desired end portion curve shape from the pull-down menu that is displayed. Here, for example, the user can select the end portion curve shape from the three options which are "boost," "normal," and "soft." Here, "boost" is selected when the user wants to remove unevenness by making a portion of a white background stark white or by making a portion of a black background pitch black. Also "normal" is selected when the highlight portion and the shadow portion are to be expressed as they are. "Soft" is selected when reverting a stark white portion to the original white background or when reverting a pitch black portion to the original black background.

A slider 145 for adjusting the grayscale balance is provided in the grayscale balance adjustment field 136. By moving the slider 145 to the left and right, it is possible to adjust the grayscale balance and remove color fogging.

Density Correction

"Density correction" is the adjustment that is used when partially changing the expression of lightness and darkness in the image. Specifically, with "density correction," the tone curve is adjusted so as to improve the appearance of the image that has been read. In other words, by adjusting the density curve (tone curve) which changes to a shadow (darkest), amid-tone (intermediate tone), and a highlight (lightest), it is possible to produce a balanced brightness and contrast in the image overall. To this end, as shown in FIG. 8, a dialog box 150 for density correction is provided with a tone curve display section 152 and a channel field 154 for selecting the type (channel (color)) of the tone curve that is displayed on the tone curve display section 152.

In the channel field 154, it is possible to make a selection from among the four options of all RGB (red, green, blue) colors, R (red) only, G (green) only, and B (blue) only. When the user wants to adjust all RGB (red, green, blue) colors, and selects the uppermost switch of the channel field 154, the tone curves of all the RGB (red, green, blue) colors are displayed to the right side. When the user wants to adjust R (red) only, and selects the second switch from the top of the channel field 154, the tone curve of R (red) only is displayed to the right side. When the user wants to adjust G (green) only, and selects the third switch from the top of the channel field 154, the tone curve of G (green) only is displayed to the right side. When the user wants to adjust B (blue) only, and selects the bottom-most switch from the top of the channel field 154, the tone curve of B (blue) only is displayed to the right side.

The tone curve whose horizontal axis is the input value and vertical axis is the output value is displayed in the tone curve display section 152. If settings have been made such that the output value does not change from the input value, the tone curve becomes a straight light as shown by line L1 in the drawing.

If the tone curve is to be adjusted, then any point is set on the tone curve that is displayed in the tone curve display section 152 and the tone curve is adjusted by shifting this point in the up, down, left, and right directions. In this embodiment, three points P1, P2, and P3 are arbitrarily set on the tone curve that is displayed in the tone curve display section 152, and these three points P1, P2, and P3 are shifted by moving them in the up, down, left, and right directions from the reference line L1 respectively. By doing this, the user forms a desired tone curve on the tone curve display section 152. It should be noted that coordinates of each of the three points P1, P2, and P3 also can be set through two numerical value input fields 156A and 156B which are provided to the left side of the tone curve display section 152 respectively. Here, by entering the input value to the upper numerical value input field 156A and entering the output value to the lower numerical value input field 156B, it is possible to set the coordinates for each of the points P1, P2, and P3 respectively.

Four types of tone curve adjustment are possible, those being all RGB (red, green, blue) colors, R (red) only, G (green) only, and B (blue) only. The tone curve setting scan be saved through a density correction setting save field 158 that is provided in an upper portion of the density correction dialog box 150.

Image Adjustment

"Image adjustment" encompasses four types of adjustment, such as (1) a brightness adjustment, (2) a contrast adjustment, (3) a saturation adjustment, and (4) a color balance adjustment, as shown in an image adjustment dialog box 160 of FIG. 9. Further, "(4) the color balance adjustment" encompasses three types of adjustments, such as an adjustment between cyan (C) and red (R), an adjustment between magenta (M) and green (G), and an adjustment between yellow (Y) and blue (B).

(1) Brightness Adjustment

"(1) The brightness adjustment" is performed when the image is too bright or too dark. "(1) The brightness adjustment" can be performed by moving a slider 162A left and right or by directly inputting the numerical value into a numerical value input field 164A that is provided to the right side of the slider 162A.

(2) Contrast Adjustment

"(2) The contrast adjustment" is performed to enhance the contrast, or conversely, to reduce the difference between light and dark. "(2) The contrast adjustment" can be performed by moving a slider 162B left and right or by directly inputting the numerical value into a numerical value input field 164B that is provided to the right side of the slider 162B.

(3) Saturation Adjustment

"(3) The saturation adjustment" is performed when amore vivid color tone is desired. "(3) The saturation adjustment" can be performed by moving a slider 162C left and right or by directly inputting the numerical value into a numerical value input field 164C that is provided to the right side of the slider 162C.

(4) Color Balance Adjustment

"(4) The color balance adjustment" is performed when the image has a red or blue tone, for example. "(4) The color balance adjustment" can be performed by moving each of sliders 162D, 162E, and 162F left and right or by directly inputting the numerical value into numerical value input fields 164D, 164E, and 164F, which are provided to the right side of each of the sliders 162D, 162E, and 162F, respectively. By doing this, it is possible to adjust the image to an appropriate color tone. Specifically, by moving the slider 162D for adjustment between "cyan (C) and red (R)" to the left or right, it is possible to adjust the strength of cyan (C) and red (R). By moving the slider 162E for adjustment between "magenta (M) and green (G)" to the left or right, it is possible to adjust the strength of magenta (M) and green (G). By moving the slider 162F for adjustment between "yellow (Y) and blue (B)" to the left or right, it is possible to adjust the strength of yellow (Y) and blue (B).

Here, "(1) the brightness adjustment" and "(4) the color balance adjustment" each is processing in which conversion for shifting the overall darkness is performed for all three colors R (red), G (green), and B (blue), or for each individual color. "(2) The contrast adjustment" is a processing in which conversion for strengthening or weakening the change in darkness is performed for all three colors R (red), G (green), and B (blue).

On the other hand, "(3) the saturation adjustment" is a processing that employs the following conversion formulas (1) through (3) to convert the data of each of the colors R (red), G (green), and B (blue) respectively. Here, the input data of each of the colors R (red), G (green), and B (blue) are indicated by "R", "G", and "B" respectively. The output data of each of the colors R (red), G (green), and B (blue) are indicated by "R'", "G'", and "B'" respectively.

$$R' = S11 \times R + S12 \times G + S13 \times B \quad (1)$$

$$G' = S21 \times R + S22 \times G + S23 \times B \quad (2)$$

$$B' = S31 \times R + S32 \times G + S33 \times B \quad (3)$$

Here, S11, S12, S13, S21, S22, S23, S31, S32, and S33 are coefficients that are set according to the value of the saturation that has been set. If the saturation is to be increased, then S11, S22, and S33 are set to values that are greater than 1, and on the other hand, S12, S13, S21, S23, S31, and S32 are set to negative values. In this manner, "(3) the saturation correction" is carried out.

Setting Data

FIGS. 10A through 10C are for describing the data that are set through the histogram adjustment, the density correction, and the image adjustment, respectively. FIG. 10A describes the data that are set through the histogram adjustment. FIG. 10B describes the data that are set through the density correction. FIG. 10C describes the data that are set through the image adjustment.

As shown in FIG. 10A, in the case of the histogram adjustment, the shadow input values $\alpha11$, $\alpha21$, $\alpha31$, the shadow output values $\alpha13$, $\alpha23$, $\alpha33$, the highlight input values $\alpha12$, $\alpha22$, $\alpha32$, the highlight output values $\alpha14$, $\alpha24$, $\alpha34$, and the gamma values $\alpha15$, $\alpha25$, $\alpha35$ of each of the colors R (red), G (green), and B (blue) are set as data. In addition to this, here, data $\alpha41$ and $\alpha42$ of the "lower end portion shape" and the "upper end portion shape" are set as data for the end portion shape of the tone curve, and an adjustment value $\alpha51$ for the grayscale balance adjustment is set as data. The scanner driver stores these data $\alpha11$, $\alpha21$, $\alpha31$, $\alpha13$, $\alpha12$, $\alpha22$, $\alpha32$, $\alpha23$, $\alpha33$, $\alpha14$, $\alpha24$, $\alpha34$, $\alpha15$, $\alpha25$, $\alpha35$, $\alpha41$, $\alpha42$, and $\alpha51$ as setting data. It should be noted that in addition to these setting data $\alpha11$, $\alpha21$, $\alpha31$, $\alpha13$, $\alpha23$, $\alpha33$, $\alpha12$, $\alpha22$, $\alpha32$, $\alpha14$, $\alpha24$, $\alpha34$, $\alpha15$, $\alpha25$, $\alpha35$, $\alpha41$, $\alpha42$, and $\alpha51$ being set by the user through the histogram adjustment dialog box 131 illustrated in FIG. 6, for example, it is also possible for those setting data to be set automatically through a computation, for example, by the scanner driver. The scanner driver executes image adjustment on the input image based on the stored setting data $\alpha11$, $\alpha21$, $\alpha31$, $\alpha13$, $\alpha23$, $\alpha33$, $\alpha12$, $\alpha22$, $\alpha32$, $\alpha14$, $\alpha24$, $\alpha34$, $\alpha15$, $\alpha25$, $\alpha35$, $\alpha41$, $\alpha42$, and $\alpha51$.

In the case of the density correction, as shown in FIG. 10B, the input coordinates $\beta11$, $\beta13$, $\beta21$, $\beta23$, $\beta31$, $\beta33$, . . . and output coordinates $\beta12$, $\beta14$, $\beta22$, $\beta24$, $\beta32$, $\beta34$ . . . , for a plurality of points P1, P2, P3, . . . that have been set on the tone curves of the colors R (red), G (green), and B (blue), respectively, are set as data. The scanner driver stores the input coordinates $\beta11$, $\beta13$, $\beta21$, $\beta23$, $\beta31$, $\beta33$, . . . and the output coordinates $\beta12$, $\beta14$, $\beta22$, $\beta24$, $\beta32$, $\beta34$, . . . for a plurality of the points P1, P2, P3, . . . as setting data. It should be noted that in addition to the setting data $\beta11$, $\beta13$, $\beta21$, $\beta23$, $\beta31$, $\beta33$, . . . $\beta12$, $\beta14$, $\beta22$, $\beta24$, $\beta32$, $\beta34$, . . . being set by the user through the density correction dialog box 150 described in FIG. 8, for example, it is also possible for those setting data to be set automatically through a computation, for example, by the scanner driver. The scanner driver executes the density correction based on the stored setting data $\beta11$, $\beta13$, $\beta21$, $\beta23$, $\beta31$, $\beta33$, . . . and $\beta12$, $\beta14$, $\beta22$, $\beta24$, $\beta32$, $\beta34$, . . . .

In the case of image adjustment, as shown in FIG. 10C, a setting value $\gamma1$ for "(1) the brightness adjustment," a setting value $\gamma2$ for "(2) the contrast adjustment," a setting value $\gamma3$ for "(3) the saturation adjustment," and setting values $\gamma4$, $\gamma5$, $\gamma6$ for "(4) the color balance adjustment" are set. There are three settings for the "(4) color balance adjustment," which are the setting value $\gamma4$ between cyan (C) and red (R), the setting value $\gamma5$ between magenta (M) and green (G), and the setting value $\gamma6$ between yellow (Y) and blue (B). The scanner driver stores the setting values $\gamma1$, $\gamma2$, $\gamma3$, $\gamma4$, y5, and y6 as setting data. It should be noted that in addition to the setting data $\gamma1$, $\gamma2$, $\gamma3$, $\gamma4$, $\gamma5$, and $\gamma6$ being set by the user through the image adjustment dialog box 160 shown in FIG. 9, it is also possible for the setting data to be set automatically through a computation by the scanner driver, for example. The scanner driver executes image adjustment based on the stored setting data $\gamma1$, $\gamma2$, $\gamma3$, $\gamma4$, $\gamma5$, and $\gamma6$.

Adjustment Procedure

Figure 11A:
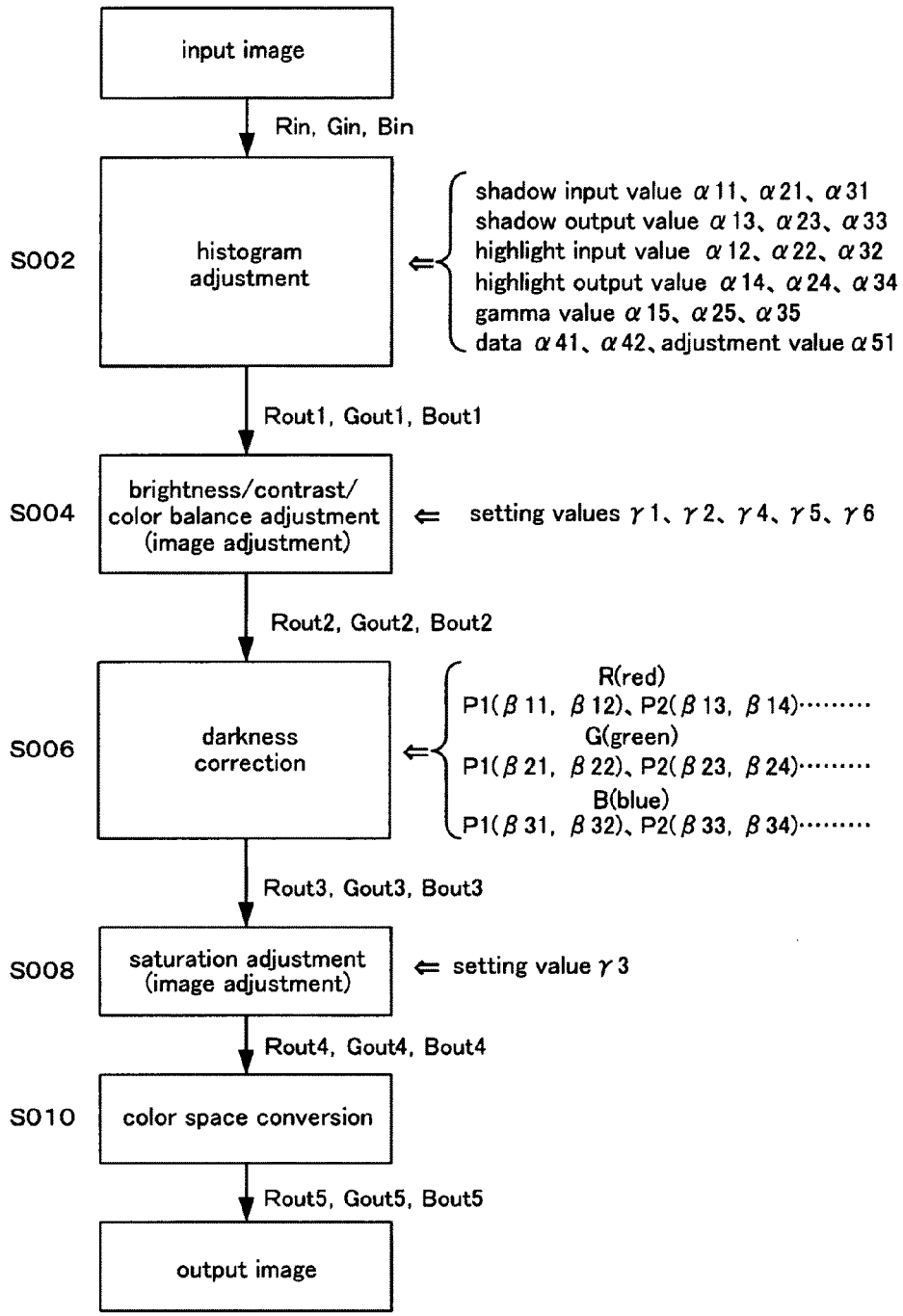
FIG. 11A is an explanatory diagram of an example of a procedure for adjusting the image.

An example of the procedure for adjusting the input image, that is, here the image that is read by the image reading device 10, based on the data that has been set through the histogram adjustment, the density correction, and the image adjustment is described. FIG. 11A shows an example of this procedure.

The scanner driver executes the histogram adjustment on the input image, that is, here the image that is read by the image reading device 10 (S002). In this histogram adjustment, the scanner driver converts and outputs the data Rin, Gin, and Bin of each of the pixels of the input image for each of the colors R (red), G (green), and B (blue) respectively, based on the tone curve defined for each of the colors R (red), G (green), and B (blue) respectively. Here, the scanner driver refers to the shadow input values $\alpha11$, $\alpha21$, $\alpha31$, the shadow output values $\alpha13$, $\alpha23$, $\alpha33$, the highlight input values $\alpha12$, $\alpha22$, $\alpha32$, the highlight output values $\alpha14$, $\alpha24$, $\alpha34$, the gamma values $\alpha15$, $\alpha25$, $\alpha35$, or the data $\alpha41$ and $\alpha42$ on the end portion shape of the tone curve or the adjustment value $\alpha51$ for the grayscale balance adjustment and the like, for each of the colors R (red), G (green), and B (blue), which have been set either automatically or by the user through the histogram adjustment dialog box 131 described in FIG. 6, and based on these data, executes the histogram adjustment. Thus, the scanner driver converts the data Rin, Gin, and Bin (input data) of each of the pixels of the input image into output data Rout1, Gout1, and Bout1 and outputs these.

After the histogram adjustment has been performed in this way, the scanner driver advances the procedure to step S004, and executes the image adjustment on the data of the image that have been subjected to the histogram adjustment (S004). Here, the scanner driver carries out image adjustment by executing (1) the brightness adjustment, (2) the contrast adjustment, and (3) the color balance adjustment. That is to say, the scanner driver executes adjustment based on the setting value $\gamma1$ for "(1) the brightness adjustment," the setting value $\gamma2$ for "(2) the contrast adjustment," and the setting values $\gamma4$, $\gamma5$, $\gamma6$ for "(4) the color balance adjustment." Thus, the scanner driver converts the output data Rout1, Gout1, and Bout1 obtained by the histogram adjustment into output data Rout2, Gout2, and Bout2 and outputs them.

Then, after the image adjustment (excluding (3) saturation adjustment) has been performed in this way, next, the scanner driver advances the procedure to step S006 and executes the density correction on the data of the image subjected to the image adjustment (S006). In the density correction, the scanner driver converts and outputs the data of each of the pixels of the input image for each of the colors R (red), G (green), and B (blue) based on the tone curve that has been adjusted for each color of R (red), G (green), and B (blue) respectively. That is, here the scanner driver refers to the setting data for the input coordinates $\beta11$, $\beta13$, $\beta21$, $\beta23$, $\beta31$, $\beta33$, . . . and the output coordinates $\beta12$, $\beta14$, $\beta22$, $\beta24$, $\beta32$, $\beta34$, . . . of a plurality of points P1, P2, P3, . . . that have been set on the tone curve for each of the colors R (red), G (green), and B (blue), and executes the density correction based on the tone curve formed based on these setting data. Thus, the scanner driver converts the output data Rout2, Gout2, and Bout2 obtained by the image adjustment (excluding (3) saturation adjustment) into output data Rout3, Gout3, and Bout3 and outputs them.

After the density correction has been performed in this way, next, the scanner driver advances the procedure to step S008 and executes "(3) the saturation adjustment" as the image adjustment on the data of the image subjected to the density correction (S008). Here, the scanner driver executes adjustment based on the setting value γ3 for "(3) the saturation adjustment." Thus, the scanner driver converts the output data Rout3, Gout3, and Bout3 obtained by the density correction into output data Rout4, Gout4, and Bout4 and outputs them.

After "(3) the saturation adjustment" has been performed as the image adjustment in this way, next, the scanner driver executes a color conversion processing on the data of the image subjected to "(3) the saturation adjustment)" (S010). The color conversion processing is processing for converting to data suitable for handling on various output devices (here, the display device as well as various types of printers, for example). Specifically, it is carried out through the following conversion formulas (4) to (6), for example.

$$R' = A11 \times R + A12 \times G + A13 \times B \quad (4)$$

$$G' = A21 \times R + A22 \times G + A23 \times B \quad (5)$$

$$B' = A31 \times R + A32 \times G + A33 \times B \quad (6)$$

Here, "R," "G," and "B" denote the input data for each of the colors red (R), green (G), and blue (B) before conversion, respectively. Likewise, "R'," "G'," and "B'" denote the output data for each of the colors red (R), green (G), and blue (B) after conversion, respectively. Also, A11, A12, A13, A21, A22, A23, A31, A32, and A33 are coefficients that are suitably set in correspondence with the characteristics of the various output devices (the display device 24 and the printer, for example).

In this way, the scanner driver executes the color conversion processing in accordance with the characteristics of various types of output devices, on the data of the image subjected to "(3) the saturation adjustment." Thus, the scanner driver converts the output data Rout4, Gout4, and Bout4 obtained by the image adjustment (excluding (3) saturation adjustment) into output data Rout5, Gout5, and Bout5 and outputs them. Then, after executing the color conversion processing in this way, the scanner driver outputs the color-converted image as the output image.

It should be noted that the example described here is a case in which the color conversion processing is executed in the last step, however it is also possible for the color conversion processing to be performed as necessary.

Here, the histogram adjustment corresponds to the "first data conversion section." The output data Rout1, Gout1, and Bout1 here correspond to the "first output data." The shadow input values α11, α21, α31, the shadow output values α13, α23, α33, the highlight input values α12, α22, α32, the highlight output values α14, α24, α34, the gamma values α15, α25, α35, the data α41 and α42 of the end portion shape of the tone curve, and the adjustment value α51 for the grayscale balance adjustment, of each of the colors R (red), G (green), and B (blue), correspond to "first setting information" here.

At least one of the image adjustment (excluding the saturation), the density correction, and the image adjustment (the saturation) corresponds to the "second data conversion section." Also, the output data Rout2, Gout2, and Bout2, the output data Rout3, Gout3, and Bout3, or the output data Rout4, Gout4, and Bout4 correspond to the "second output data" here. Also, the setting values γ1, γ2, γ4, γ5, γ6, the input coordinates β11, β13, β21, β23, β31, β33, . . . and the output coordinates β12, β14, β22, β24, β32, β34, . . . of a plurality of points P1, P2, P3, . . . , or the setting value γ3 correspond(s) to the "second setting information" here.

Pre-Scan

Figure 11B:
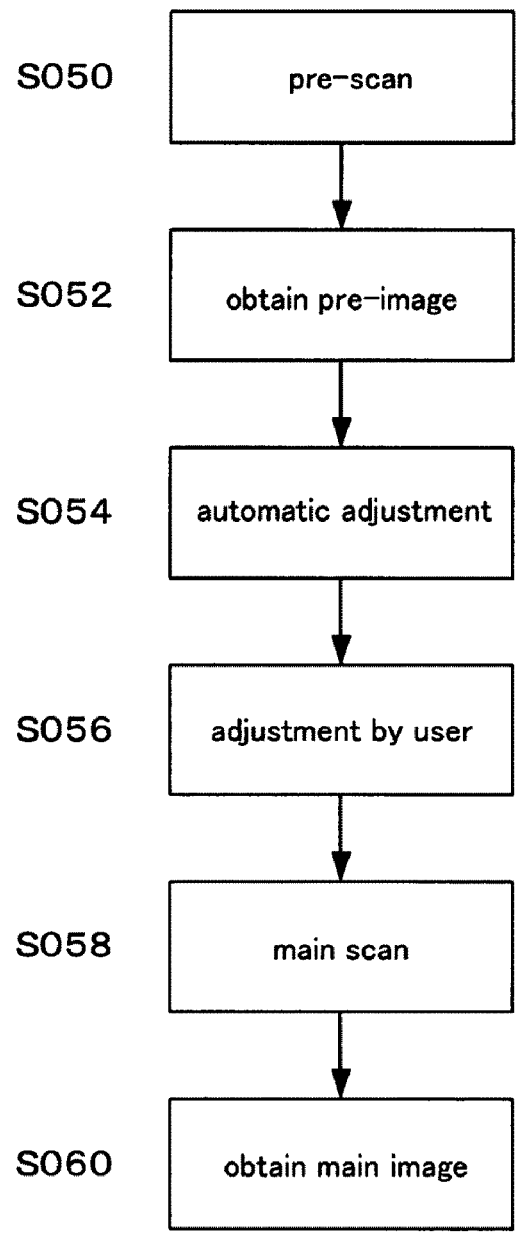
FIG. 11B is an explanatory diagram of an example of an image reading procedure.

FIG. 11B illustrates an example of an image reading procedure by the image reading device 10. When the image reading device 10 reads an image, it may execute a pre-scan. If an image is to be read at high resolution, for example, a pre-scan refers to reading an image a single time, for example, at low resolution, before executing the operation of reading the image at high resolution (main scan), rather than executing the operation of reading the image at high resolution initially.

The pre-scan is executed first, as shown in the drawing (S050). The scanner driver obtains a pre-scan image (pre-image) through this pre-scan operation (S052). Next, the scanner driver executes automatic adjustment, for example, on the pre-scan image (pre-image) that has been obtained. Here, the scanner driver finds suitable adjustment values, for example, for the histogram adjustment, the density correction, or the image adjustment, for example, for the pre-scan image (pre-image) that has been obtained, and automatically corrects the pre-scan image (pre-image) (S054). Here, the automatically corrected image is displayed on the display device 24 and the like, for example.

In this way, the user performs various adjustments (corrections) while viewing the pre-scan image (pre-image) displayed on the display device 24 or the like (S056). Here, the user performs the various adjustments (corrections) through the histogram adjustment dialog box 131 of FIG. 6, the density correction dialog box 150 of FIG. 8, and the image adjustment dialog box 160 of FIG. 9, for example.

After the various adjustments (corrections) have been performed by the user in this way, the main scan is executed. With the main scan, an image is read at high resolution from the original document 15 by the image reading device 10 (S058). The scanner driver then executes the various adjustments (corrections) such as the histogram adjustment, the density correction, and the image adjustment, on the high-resolution image that is obtained through the main scan, based on the data that has been set by the user and the like. Thus, the main image that has been subjected to the various adjustments (corrections) is obtained (S060).

Conventional Problems and Solutions

Conventional Problems

By individually adjusting the settings for each of the histogram adjustment, the density correction, and the image adjustment, for example, the user can execute various types of adjustment on the image that has been read by the image reading device. However, when the user would like to adjust the image to a desired color tone, the user must select an appropriate adjustment method from among the various adjustments such as the histogram adjustment, the density correction, and the image adjustment, and by using that adjustment method, the user must perform appropriate adjustment through trial and error to find the desired color tone, and thus in some instances it was extremely difficult for the user to find the desired color tone. This was an extremely taxing process especially for users who are not familiar with the color tone adjustment, and the like.

Further, the various adjustment processings such as the histogram adjustment and the density correction that are performed here are executed in a predetermined order on the image that has been read by the image processing device 10, that is, on the original image, as illustrated in FIG. 11A. Thus, depending on the adjustment processing executed by the user, there were cases in which overflow occurred and prevented the information of the original image from being fully utilized, or caused a smooth gradation to be lost. Thus, it was extremely difficult for the users to make a decision on whether or not to perform a particular adjustment.

Also, when the user wants to select a desired color when adjusting the color tone, it was not easy for the user to search for the desired color based on the existing colors, and it was extremely difficult to adjust the color tone smoothly.

Solutions

For this reason, the scanner driver of this embodiment is provided with a user interface that allows the user to specify any pixel on the image to be adjusted, and for the user to directly specify a desired color for that pixel. Since such user interface is provided, the scanner driver of this embodiment adjusts the overall color tone of the image to be edited so that a pixel that has been arbitrarily designated by the user becomes the desired color that is designated by the user. Thus, the user can easily change an image to be edited to a desired color tone without performing the adjustment of the various adjustments known conventionally, such as the histogram adjustment, the density correction, and the image adjustment.

In this embodiment, the user can specify a desired color for the image that is ultimately output. Moreover, since the upstream side adjustment element is selected from a plurality of adjustment elements and changed based on the information of the desired color that is specified by the user, it is possible to inhibit the occurrence of problems such as overflow. Thus, it becomes easier for the user to perform color adjustment.

Also, this embodiment allows the user to readily search for a desired color and then smoothly adjust the color tone, by displaying an editing palette that has a first patch with the same color as the color of a pixel arbitrarily specified by the user on the image to be edited, and second patches of a plurality of types of colors that differ in steps from the color of the first patch in at least one of their hue or lightness.

Specific Adjustment Method

Here, first the user designates any pixel whose color the user wants to specify on the image to be adjusted. Next, the user specifies a desired color for that designated pixel.

Pixel Designation

Figure 12:
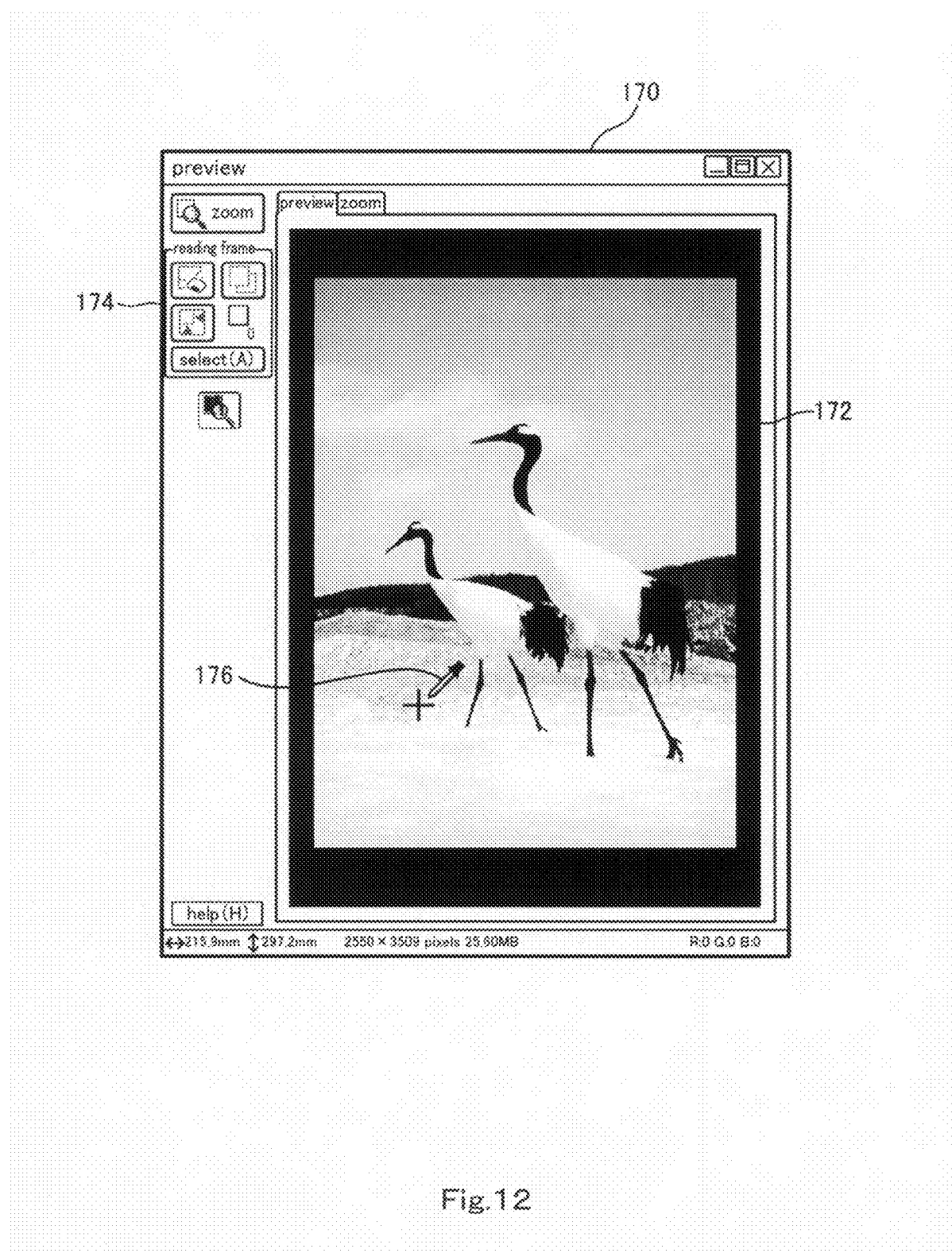
FIG. 12 is an explanatory diagram of an example of a preview window on which the image to be edited is displayed.

Here, the user designates a pixel through a preview window on which the image to be edited is displayed. FIG. 12 shows an example of a preview window 170. As shown in the figure, the preview window 170 has a preview region 172 on which the image to be edited is to be displayed, and a control region 174 provided with various control buttons for performing various controls such as setting the reading frame for, or zooming in on, the image displayed in the preview window 172. It should be noted that in this embodiment, the image after various adjustments (corrections) performed by the scanner driver or the user on the image that is read by the image reading device, that is, the image after the histogram adjustment, the density correction, and the image adjustment, for example, is displayed in the preview region 172 as the image to be edited.

Also, in addition to the image to be edited, a pointer 176 for the user to arbitrarily designate any pixel from the image is displayed in the preview region 172. The pointer 176 can be arbitrarily moved by the user in any vertical or horizontal direction over the image that is displayed in the preview region 172. Thus, the user can move the pointer 176 in any vertical or horizontal direction over the image that is displayed in the preview region 172 and stop the pointer 176 at the position of a pixel whose color the user would like to designate, and performs an operation for designation.

Color Designation

Figure 13:
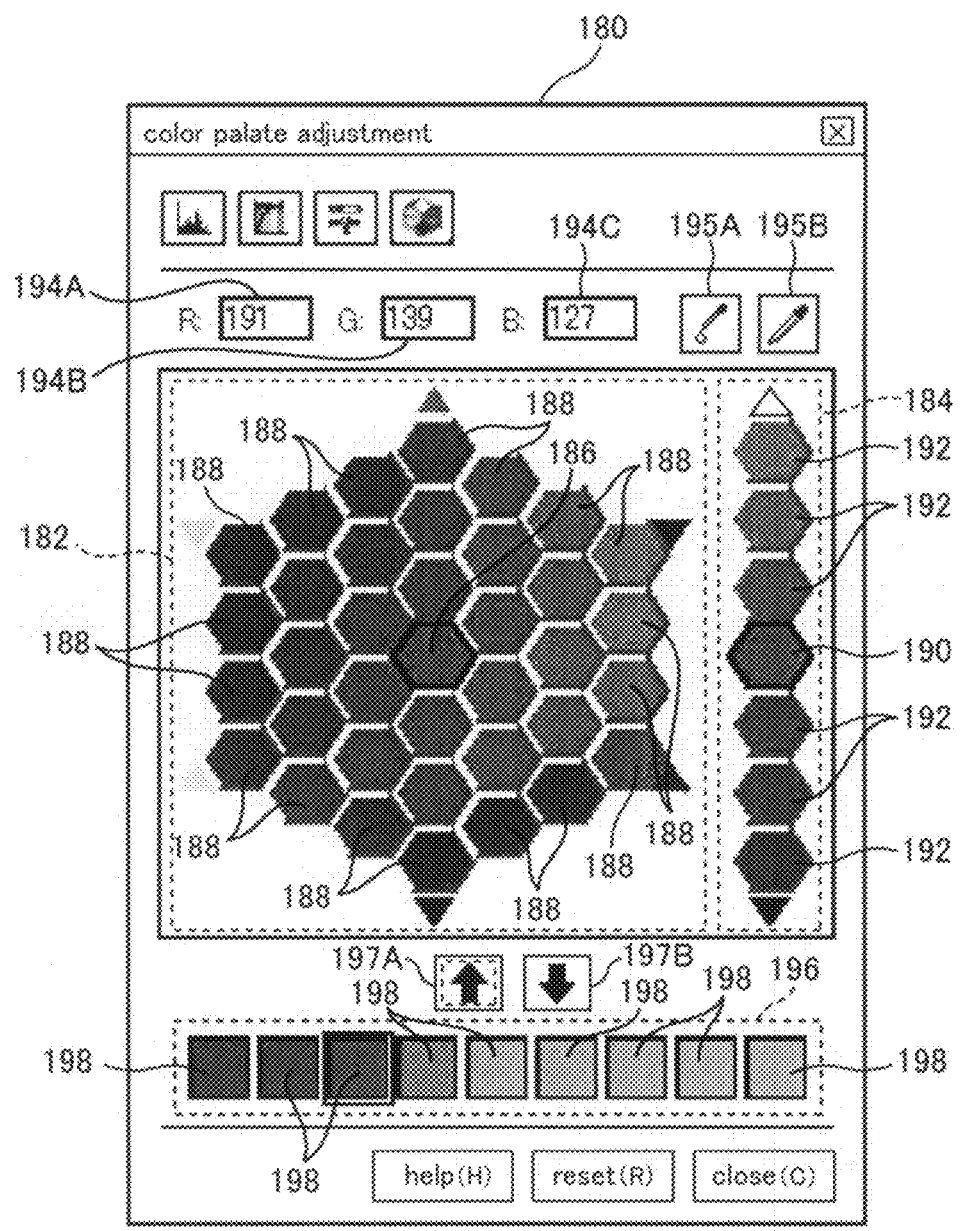
FIG. 13 is an explanatory diagram of an example of a color palette adjustment dialog box.

The designation of a desired color for a pixel that has been designated by the user is made through a color palette adjustment dialog box. FIG. 13 illustrates an example of a color palette adjustment dialog box 180. The dialog box 180 is provided with two types of color palettes, a hue color palette 182 and a lightness color palette 184. It should be noted that the color palettes 182 and 184 correspond to the "editing palette." The display controller 88 for displaying the color palettes 182 and 184 on the display device 24 as the "editing palette" corresponds to "palette display controller."

The hue color palette 182 has selection color patches 188 for a plurality of types of colors each with a different hue, and from the selection color patches 188 of a plurality of types of colors the user can select a desired color patch to designate the color. On the other hand, the lightness color palette 184 has color selection patches 192 of a plurality of types of colors each with different lightness, and from the selection color patches 192 of a plurality of types of colors the user can select a desired color patch to designate the color. It should be noted that the selection color patches 188 of the hue color palette 182 and the selection color patches 192 of the lightness color palette 184 correspond to "second patches." The hue color palette 182 and the lightness color palette 184 are described in detail below.

(1) Hue Color Palette

In addition to the selection color patches 188 of a plurality of types of colors with different hues, the hue color palette 182 also has a designated color patch 186 for showing the color that is currently designated. It should be noted that the designated color patch 186 corresponds to the "first patch." The designated color patch 186 is disposed in the center of the selection color patches 188 of a plurality of types of colors. The selection color patches 188 of a plurality of types of colors are disposed around the designated color patch 186 in such a manner that the designated color patch 186 is in the center. The designated color patch 186 and the selection color patches 188 both are formed in hexagons of the same size. The designated color patch 186 and the selection color patches 188 are disposed such that their side portions are in close contact with one another. Thus, the overall shape of the designated color patch 186 and the selection color patches 188 is hexagonal in nature.

The designated color patch 186 located in the center is set to the same color as the pixel that has been arbitrarily designated by the user through the pointer 176 from the image displayed in the preview region 172 of the preview window 170. On the other hand, the selection color patches 188 surrounding the designated color patch 186 are set to colors whose hues are different in steps from the color of the designated color patch 186 located in the center. In other words, the colors of the selection color patches 188 are set so that each hue is independently and relatively different from the designated color patch 186. The colors that are set for each of the selection color patches 188 respectively are described here.

Figure 14:
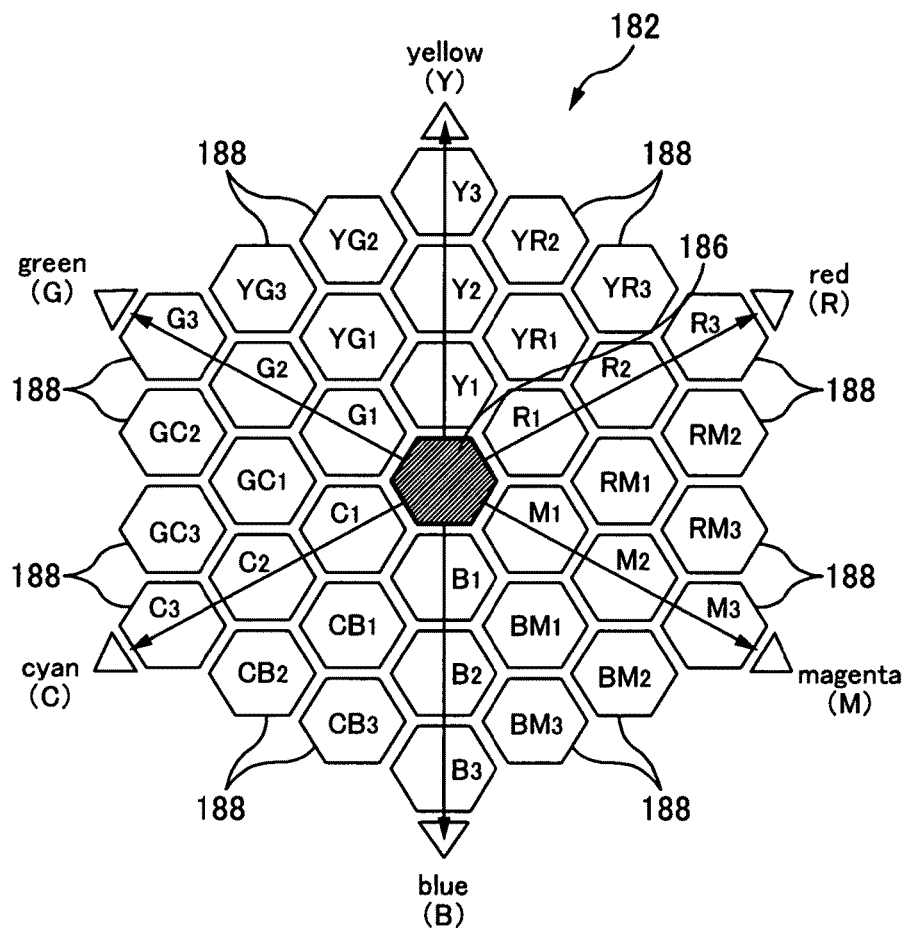
FIG. 14 is an explanatory diagram of an example of a hue color palette.

FIG. 14 is a detailed description of the colors that are set for each of the selection color patches 188 of the hue color palette 182. The selection color patches 188 are set to colors whose hue gradually differs from the color of the designated color patch 186 moving away from the designated color patch 186, with the designated color patch 186 in the center. More specifically, the colors of the selection color patches 188 are set to different colors moving toward the upward direction, the downward direction, the diagonally downward left direction, the diagonally upward left direction, the diagonally downward right direction, and the diagonally upward right direction from the designated color patch 186, with the designated color patch 186 located in the center, that is, here each of the selection color patches 188 are set to colors whose hues change to yellow (Y), blue (B), cyan (C), green (G), magenta (M), and red (R).

Each of the selection color patches Y1, Y2, and Y3 in the upward direction from the designated color patch 186 are set so that hues of yellow (Y) becomes gradually stronger than the color of the designated color patch 186 respectively. Each of the selection color patches R1, R2, and R3 in diagonally upward right direction from the designated color patch 186 are set so that hues of red (R) becomes gradually stronger than the color of the designated color patch 186 respectively. Each of the selection color patches M1, M2, and M3 in the diagonally downward right direction from the designated color patch 186 are set so that hues of magenta (M) becomes gradually stronger than the color of the designated color patch 186 respectively. Each of the selection color patches B1, B2, and B3 in the downward direction from the designated color patch 186 are set so that hues of blue (B) becomes pr gradually stronger than the color of the designated color patch 186 respectively. Each of the selection color patches C1, C2, and C3 in the diagonally downward left direction from the designated color patch 186 are set so that hues of cyan (C) becomes gradually stronger than the color of the designated color patch 186 respectively. Each of the selection color patches G1, G2, and G3 in the diagonally upward left direction from the designated color patch 186 are set so that hues of green (G) becomes gradually stronger than the color of the designated color patch 186 respectively.

Each ratio of the change in hue of the selection color patches Y1, Y2, and Y3, the selection color patches R1, R2, and R3, the selection color patches M1, M2, and M3, the selection color patches B1, B2, and B3, the selection color patches C1, C2, and C3, and the selection color patches G1, G2, and G3 is set to a ratio of 1:3:6, for example.

In this way, by providing the selection color patches Y1, Y2, Y3, R1, R2, R3, M1, M2, M3, B1, B2, B3, C1, C2, C3, G1, G2, and G3 whose hue changes into each color of yellow (Y), red (R), magenta (M), blue (B), cyan (C), and green (G) moving in the upward direction, the downward direction, the diagonally downward left direction, the diagonally upward left direction, the diagonally downward right direction, and the diagonally upward right direction from the designated color patch 186 in the center respectively, the direction of the change in color can be easily understood.

Between the selection color patches Y1, Y2, Y3 and the selection color patches R1, R2, R3 are disposed selection color patches YR1, YR2, and YR3 that have a color that is intermediate to these colors. It should be noted that here the selection color patches YR2 and YR3 are set to hues that have stronger yellow (Y) or red (R) than the selection color patch YR1.

Between the selection color patches R1, R2, R3 and the selection color patches M1, M2, M3 are disposed selection color patches RM1, RM2, and RM3 that have a color that is intermediate to these colors. It should be noted that here the selection color patches RM2 and RM3 are set to hues that have stronger red (R) or magenta (M) than the selection color patch RM1.

Between the selection color patches M1, M2, M3 and the selection color patches B1, B2, B3 are disposed selection color patches BM1, BM2, and BM3 that have a color that is intermediate to these colors. It should be noted that here the selection color patches BM2 and BM3 are set to hues that have stronger magenta (M) or blue (B) than the selection color patch BM1.

Between the selection color patches B1, B2, B3 and the selection color patches C1, C2, C3 are disposed selection color patches CB1, CB2, and CB3 that have a color that is intermediate to these colors. It should be noted that here the selection color patches CB2 and CB3 are set to hues that have stronger cyan (C) or blue (B) than the selection color patch CB1.

Between the selection color patches C1, C2, C3 and the selection color patches G1, G2, G3 are disposed selection color patches GC1, GC2, and GC3 that have a color that is intermediate to these colors. It should be noted that here the selection color patches GC2 and GC3 are set to hues that have stronger cyan (C) or green (G) than the selection color patch GC1.

Between the selection color patches G1, G2, G3 and the selection color patches Y1, Y2, Y3 are disposed selection color patches YG1, YG2, and YG3 that have a color that is intermediate to these colors. It should be noted that here the selection color patches YG2 and YG3 are set to hues that have stronger yellow (Y) or green (G) than the selection color patch YG1.

(2) Lightness Color Palette

On the other hand, the lightness color palette 184, like the hue color palette 182, has a designated color patch 190 for showing the color that is currently designated in addition to the selection color patches 192 of a plurality of types of colors each with different hues. It should be noted that the designated color patch 190 corresponds to the "first patch." The designated color patch 190 is located in the center of the selection color patches 192 of a plurality of types of colors. The selection color patches 192 of a plurality of types of colors are disposed in a straight line form in the up-down direction (vertical direction), with the designated color patch 190 in the center. The designated color patch 190 and the selection color patches 192 both are formed in hexagons of the same size. The designated color patch 190 and the selection color patches 192 are disposed such that their side portions are in close contact with one another.

The designated color patch 190 located in the center is set to the same color as the pixel that has been arbitrarily specified by the user using the pointer 176 from the image displayed in the preview region 172 of the preview window 170. On the other hand, the selection color patches 192 are set so that their lightness differs in steps from the color of the designated color patch 190 located in the center. In other words, the colors of the selection color patches 192 are set so that each has an independently and relatively different lightness from the color of the designated color patch 190. The colors that are set to each of the various selection color patches 192 respectively are described here.

Figure 15:
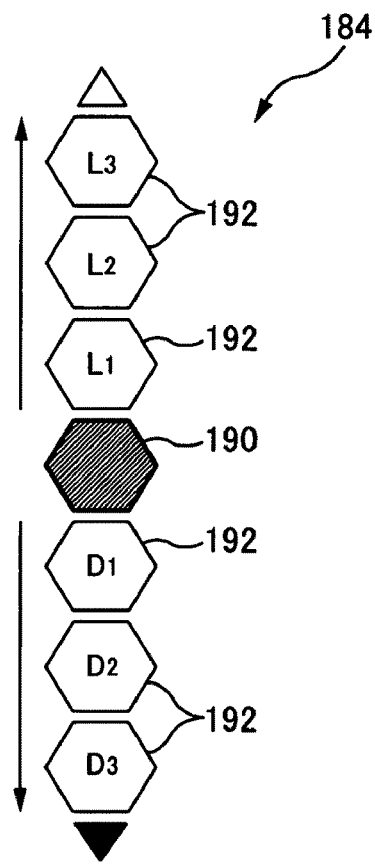
FIG. 15 is an explanatory diagram of an example of a lightness color palette.

FIG. 15 describes in detail the colors that are set for each of the selection color patches 192 of the lightness color palette 184. The selection color patches 192 are set to colors whose lightness is gradually different from the color of the designated color patch 190 moving in the upward and downward direction from the designated color patch 190, with the designated color patch 186 in the center.

Each of the selection color patches L1, L2, and L3 are set to colors that become gradually brighter than the designated color patch 190 in the upward direction from the designated color patch 190. Here, the lightness changes in three stages moving in the upward direction from the designated color patch 190. The ratio of the change in the lightness of each of the selection color patches L1, L2, and L3 is set to a ratio such as 1:3:6, for example. In other words, the lightness is set so that the selection color patch L2 becomes brighter than the selection color patch L1. Additionally, the lightness is set so that the selection color patch L3 becomes brighter than the selection color patch L2.

On the other hand, each of the selection color patches D1, D2, and D3 are set to colors that become gradually darker than the designated color patch 190 moving in the downward direction from the designated color patch 190. Here, the lightness changes in three stages moving in the downward direction from the designated color patch 190. The ratio of the change in the lightness of each of the selection color patches D1, D2, and D3 is set to a ratio such as 1:3:6, for example. In other words, the lightness is set so that the selection color patch D2 becomes darker than the selection color patch D1. Additionally, the lightness is set so that the selection color patch D3 becomes darker than the selection color patch D2.

(3) Color Designation

The user can specify a color by selecting any selection color patch from among the selection color patches 188 and 192 of a plurality of types of colors that are provided in the two color palettes 182 and 184. When the user clicks and thereby designates one selection color patch from among a plurality of the types of selection color patches 188 and 192, the color of the designated color patch 186 and 190 located in the center of each of the color palettes 182 and 184 are replaced by the color of the selection color patch 188 and 192 that has been specified by the user. That is, the color of the selection color patch that has been specified by the user moves to the center, where the designated color patches 186 and 190 are located.

By doing this, the colors of the selection color patches 188 and 192 of the two color palettes 182 and 184 are both changed. That is, the colors of each of the selection color patches 188 and 192 of the two color palettes 182 and 184 are changed based on the color of the designated color patches 186 and 190 that have been newly set by the user. That is to say, the colors of each of the selection color patches 188 and 192 of the two color palettes 182 and 184 are reset so that their hue or darkness is gradually different from the new color that has been set for the designated color patches 186 and 190.

Also, when the user once again clicks and selects any selection color patch 188 and 192 from among a plurality of the selection color patches 188 and 192 of the two color palettes 182 and 184, the color of the selection color patch 188 and 192 that has been selected here is set as the new color of the designated color patches 186 and 190. Then, the colors of each of the selection color patches 188 and 192 of the two color palettes 182 and 184 are once again reset and changed.

In this way, the user sequentially clicks on and selects any selection color patch from among the selection color patches 188 and 192 of a plurality of types of color of the two color palettes 182 and 184 and thus can gradually approach a desired color. Thus, the user can easily search for a selection color patch 188 and 192 with a desired color.

(4) Others

In addition, as shown in FIG. 13, the color palette adjustment dialog box 180 is also provided with three numerical value input fields 194A, 194B, and 194C for numerically designating the color of the designated color patches 186 and 190 disposed in the center of the two color palettes 182 and 184 respectively. The three numerical value input fields 194A, 194B, and 194C are for inputting numerical values for red (R), green (G), and blue (B), respectively. By entering numerical values into each of these three numerical value input fields 194A, 194B, and 194C, the user can designate a color with ease.

The color palette adjustment dialog box 180 is also provided with a color save field 196, on the lower side of the two color palettes 182 and 184, for saving colors that have been designated by the user. The color save field 196 is provided with nine color save boxes 198. The user can save a different color in each of these nine color save boxes 198. When saving a color in one of these nine color save boxes 198, the user clicks on a save button 197B provided on the upper side of the color save field 196. When the user wants to designate a color that has been saved in the color save box 198 as the color of the designated color patch, the user clicks on an apply button 197A provided on the upper side of the color save field 196. Thus, designated color patches 186 and 190 with the same color as the color that is saved in the color save box 198 are displayed on the two color palettes 182 and 184.

The color palette adjustment dialog box 180 is also provided with an extraction pipette button 195B for calling up the pointer for designating a desired pixel from the image to be edited that is displayed in the preview region of the preview window 170, and an apply pipette button 195A for applying the color that has been designated on the two color palettes 182 and 184, that is, the color of the designated color patches, to any pixel on the image to be edited that is displayed in the preview region of the preview window 170.

Adjustment of the Overall Image

The scanner driver adjusts the overall color of the image to be edited in such a manner that a pixel that has been designated by the user becomes the color specified by the user. It should be noted that here the scanner driver corresponds to "color adjustment section." In this adjustment, the scanner driver does not execute adjustment in the form of post-processing on an image that has already been subjected to adjustment or correction such as the histogram adjustment, the density correction, or the image adjustment, but rather executes adjustment by changing the adjustment or correction that has already been performed. This is because in cases where adjustment is executed in the form of post-processing such as the histogram adjustment, the density correction or the image adjustment that has been performed already, there are instances in which negative effects occur, such as cases in which the information of the original image (here, the image that has been read by the image reading device 10) cannot be utilized fully or in which the smooth gradation is lost. By the scanner driver changing the adjustment or correction that has been executed already, the overall color of the image to be edited is adjusted while eliminating these negative effects. The method of the adjustment that is executed here is described in detail below. It should be noted that the scanner driver corresponds to "setting information change section."

Figure 16:
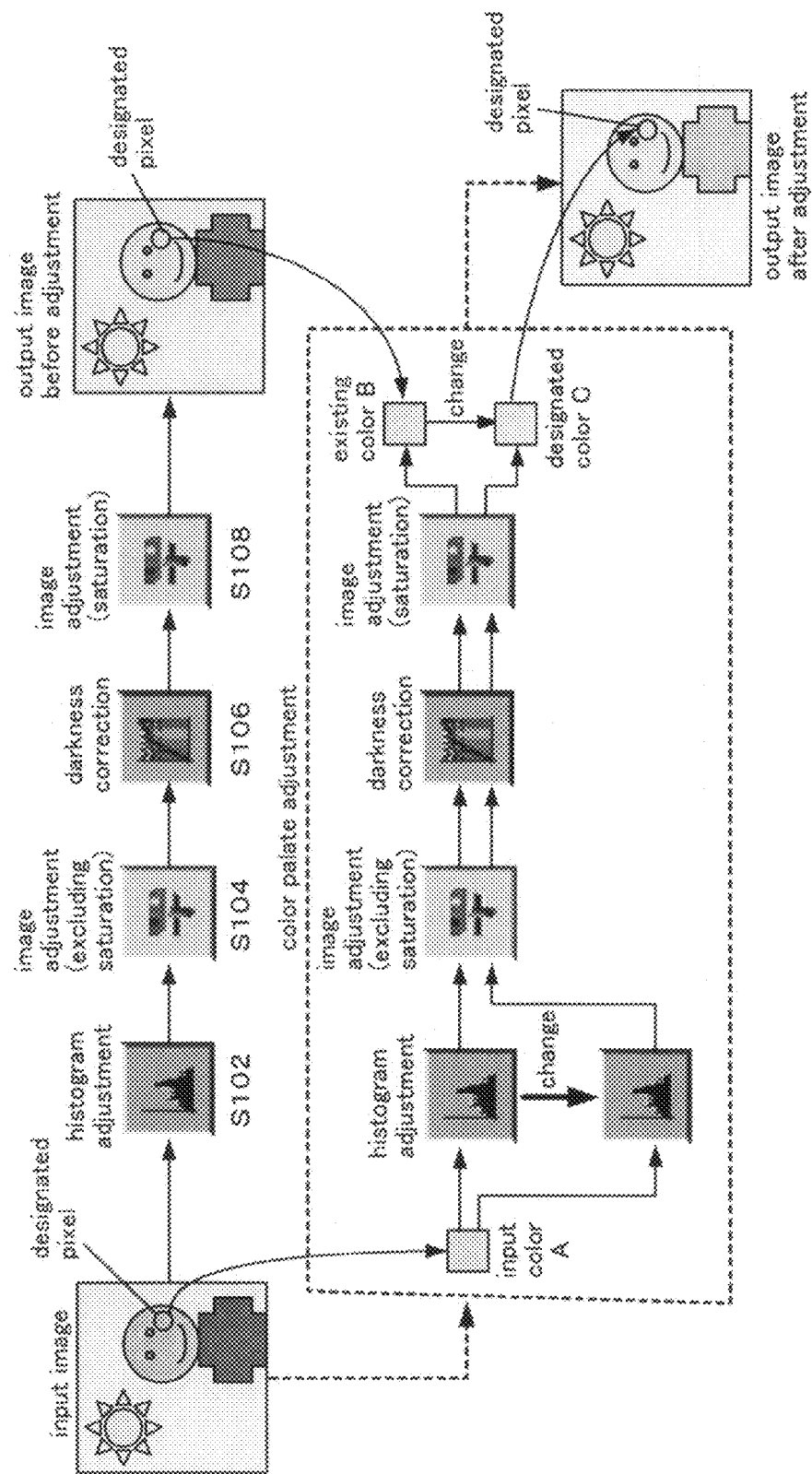
FIG. 16 is an explanatory diagram of an overview of the color palette adjustment.

FIG. 16 is for describing an overview of the color palette adjustment that is executed here. As described in FIG. 11A as well, prior to performing the color palette adjustment, first an input image such as the image read by the image reading device 10 is subjected to the histogram adjustment (S102) and then the image adjustment (S104). In this image adjustment, adjustments other than the saturation adjustment, that is, the brightness adjustment, the contrast adjustment, and the color balance adjustment, are executed. After the image adjustment is performed in this way, the image on which the image adjustment has been executed is then subjected to the density correction (S106) and then adjustment of the saturation is performed as the image adjustment (S108). Thus, an output image subjected to various adjustments is obtained from the input image (the image read by the image reading device 10). It should be noted that here, the color conversion processing has been omitted from the description.

Here, it is assumed that through the color palette adjustment the user designates any pixel from the image to be edited, and then designates the desired color for that pixel. The color of the pixel that has been designated by the user has been changed from an input color A of the corresponding pixel on the input image to an existing color B through the histogram adjustment, the density correction, and the image adjustment, for example. To change the existing color B that has been changed in this way to the designated color C that has been designated by the user, it is necessary to change at least one of the histogram adjustment, the density correction, and the image adjustment in order to tune the input color A of the corresponding pixel on the input image from the existing color B to the designated color C.

In this embodiment, to change the existing color B to the designated color C, the most upstream adjustment element, that is, here, the histogram adjustment, is changed so that the input color A of the corresponding pixel on the input image is adjusted to the designated color C. The reason why the most upstream adjustment element, that is, here, the histogram adjustment, is selected in order to change the existing color B of the pixel that has been designated by the user to the designated color C that has been designated by the user in this way is as follows. That is, this is because overflow occurs when an adjustment element other than the most upstream side adjustment element, for example, such as the image adjustment (excluding saturation) or the density correction or the saturation correction, which are a midstream adjustment element or a downstream side adjustment element, is selected. When such overflow occurs, it may become impossible to fully utilize the information of the original image (here, the image that is read by the image reading device 10) or the smooth gradation may be lost. As another reason of choosing the histogram adjustment is because the histogram adjustment has a greater effect on the image than other adjustment elements.

To change the existing color B to the designated color C by changing the histogram adjustment, it is necessary to find the appropriate amount by which to change the histogram adjustment. Here, the appropriate amount by which to change the histogram adjustment is found through the following method.

Figure 17:
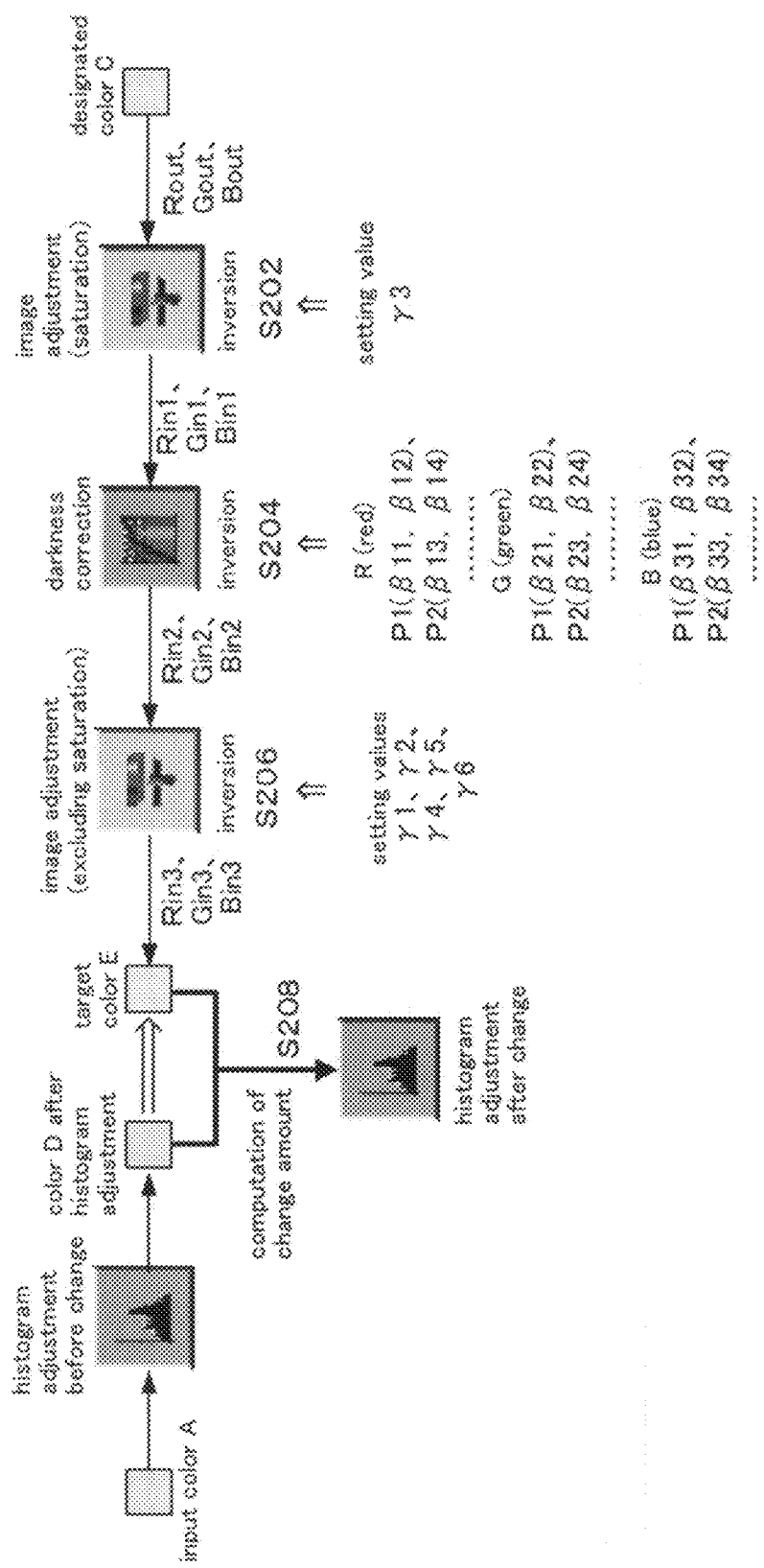
FIG. 17 is an explanatory diagram of an example of the procedure through which a suitable amount by which to change the histogram adjustment is found.

FIG. 17 illustrates an example of the procedure for finding the appropriate amount by which to change the histogram adjustment in order to change the existing color B to the designated color C. To find the appropriate amount by which to change the histogram adjustment, first the user executes the inverse of the saturation adjustment on the color that has been designated by the user, that is, the designated color C, obtaining RGB values Rin1, Gin1, and Bin1 prior to the saturation correction (S202). Here, the scanner driver executes the inverse of the saturation adjustment based on the setting data for the adjustment of saturation, that is, here, the setting value γ3.

Next, the RGB values Rin1, Gin1, and Bin1 prior to the saturation adjustment that have been obtained in this way are subjected to the inverse of the density correction in order to find the RGB values Rin2, Gin2, and Bin2 prior to the execution of the density correction (S204). Here, the scanner driver references the density correction setting data, that is, here the setting data of the input coordinates β11, β13, β21, β23, β31, β33, . . . and the output coordinates β12, β14, β22, β24, β32, β34, . . . for a plurality of the points P1, P2, P3, . . . that have been set on the tone curves for each of the colors R (red), G (green), and B (blue), and based on the tone curve that is formed based on these setting data, executes the inverse of density correction.

Then, the inverse of image adjustment (excluding saturation) is executed on the RGB values Rin2, Gin2, and Bin2 prior to the density correction thus obtained, so as to find RGB values Rin3, Gin3, and Bin3 before the image adjustment (excluding saturation) is executed (S206). Here, the scanner driver executes the inverse of the image adjustment (excluding saturation) based on the setting data for the image adjustment (excluding saturation), that is, here the setting value γ1 for the "(1) brightness adjustment," the setting value γ2 for the "(2) contrast adjustment," and the setting values γ4, γ5, γ6 for the "(4) color balance adjustment." By doing this, the RGB values Rin3, Gin3, and Bin3 after the histogram adjustment that correspond to the designated color C are found. Here, the color expressed by the RGB values Rin3, Gin3, and Bin3 shall be a target color E. The appropriate amount by which to change the histogram adjustment so that the color D after the histogram adjustment has been executed on the input color A becomes the target color E is found (S208).

It should be noted that in the description of FIG. 17, a description of the inverse color conversion processing has been omitted, but if necessary, it is also possible to perform the inverse of the color conversion processing. An example of the conversion formulas for the inversion of the color conversion is shown below.

$$R = A11' \times R' + A12' \times G' + A13' \times B' \tag{4'}$$

$$G = A21 \times R' + A22 \times G' + A23 \times B' \tag{5'}$$

$$B = A31 \times R' + A32' \times G' + A33' \times B' \tag{6'}$$

In these conversion formulas (4') to (6'), "R," "G," and "B" denote the data of the colors red (R), green (G), and blue (B) after inversion respectively. Likewise, "R'," "G'," and "B'" denote the data of the colors red (R), green (G), and blue (B) before inversion respectively. A11', A12', A13', A21', A22', A23', A31', A32', and A33' are coefficients that are suitably set in correspondence with the characteristics of the various output devices (the display device 24, printer, and the like).

With these conversion formulas (4') through (6'), the inversion of the color conversion processing can be executed with ease.

Finding the Change Amount

Figure 18:
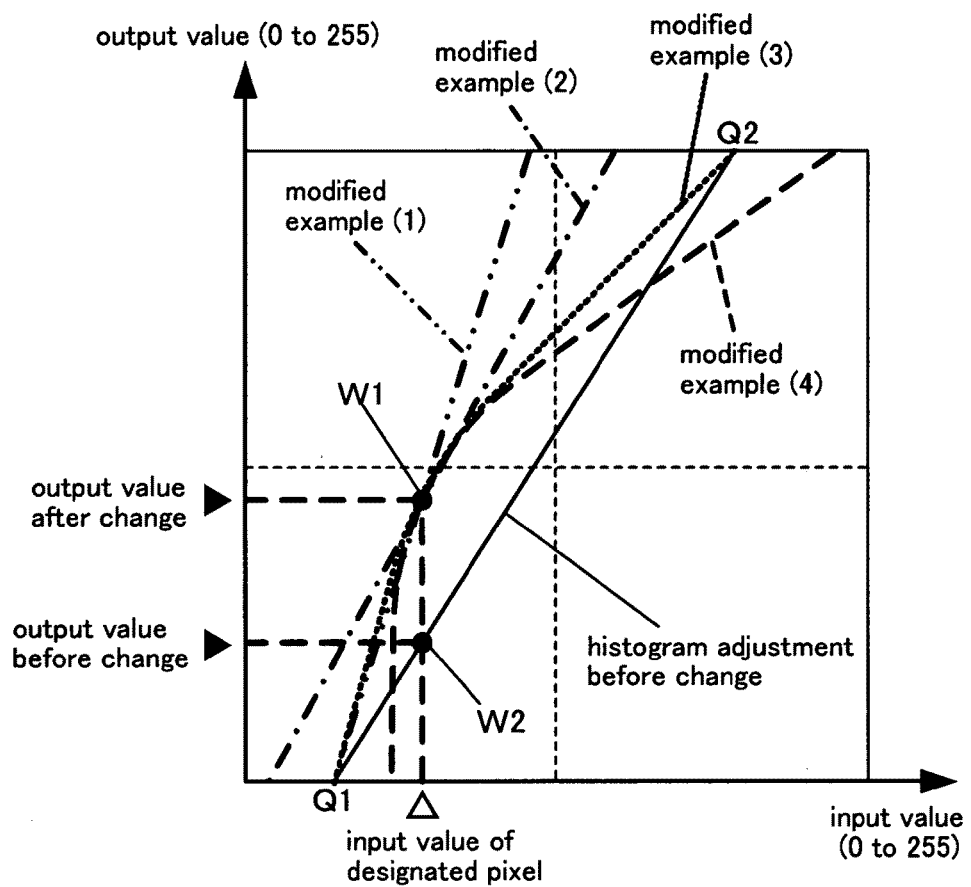
FIG. 18 is an explanatory diagram of an example of the method of which a suitable amount by which to change the histogram adjustment is found.

FIG. 18 describes the method for finding the amount by which to change the histogram adjustment from the RGB values of the target color E. As illustrated in FIG. 17, the output values after the change of the histogram adjustment are the values of the color specified by the user, that is, the RGB color values of the target color E that are obtained from the designated color C by performing the inversion of saturation adjustment, the density correction, and the image adjustment. For this reason, the input-output characteristics of the histogram adjustment after the change must be characteristics that, as shown in FIG. 18, pass through the output value after changing the histogram adjustment, that is the point W1 corresponding to the RGB color values of the target color E and the RGB color values (input values) of the pixel that has been designated. Here, various characteristics are conceivable for the input-output characteristics that pass through the point W1, and for example there are the modified examples (1) through (4) as shown in the drawing.

Here, examining the conditions under which the histogram adjustment may be changed while maintaining, as much as possible, the image quality before changing the histogram adjustment, it is conceivable that input-output characteristics such as those shown in modified example (3) are preferable. The input-output characteristics of the modified example (3) are set so that they pass through points Q1 and Q2 in which the output values of the input-output characteristics before the change to the histogram adjustment are the minimum value (here, 0) and the maximum value (here, 255). By setting the modified input-output characteristics so that they pass through the points Q1 and Q2 representing the minimum value and the maximum value of the output value of the input-output characteristics before the change to the histogram adjustment, the gradation information that is expressed in the output image can be retained as much as possible.

Figure 19:
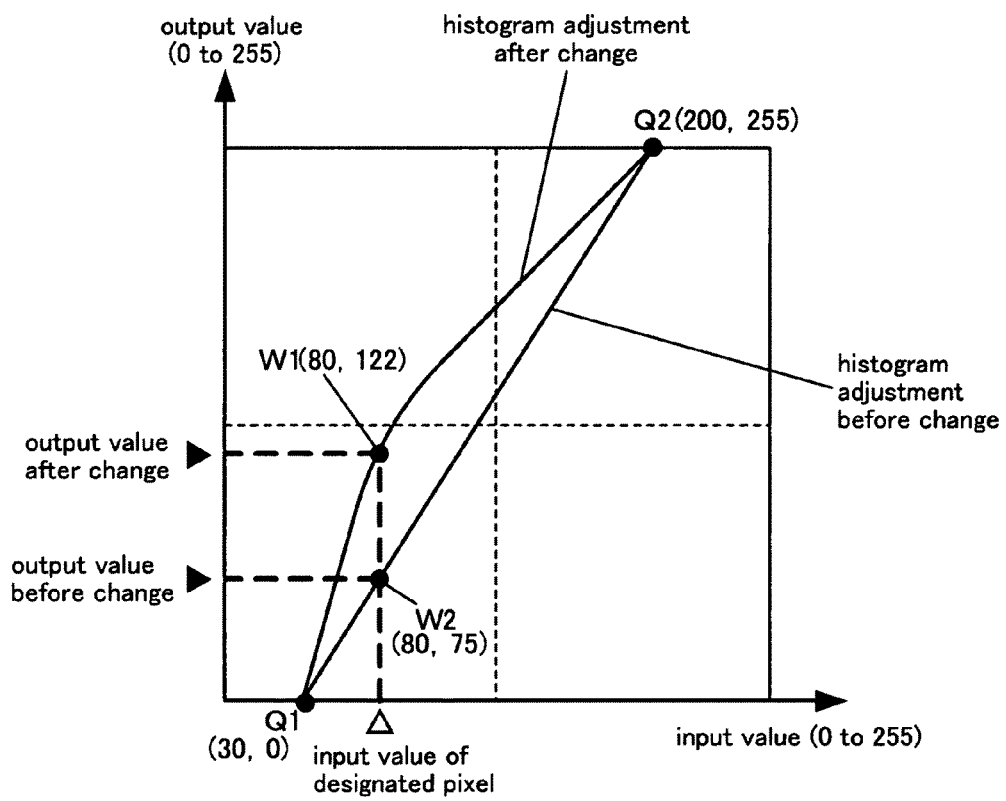
FIG. 19 is an explanatory diagram of an example of the method for finding the amount by which to change the histogram adjustment specifically through computation.

FIG. 19 illustrates an example of the method for finding the amount by which to change the histogram adjustment by a specific computation. Here, the coordinates of the point W1 corresponding to the output values after the change to the histogram adjustment, that is, the RGB color values of the target color E, and the RGB color values (input values) of the designated pixel are (80, 122). The coordinates of the point W2 corresponding to the output values before the change to the histogram adjustment, that is, the RGB color values of the color D, and the RGB color values (input values) of the designated pixel are (80, 75). The coordinates of the points Q1 and Q2, in which the output values of the input-output characteristics before the change to the histogram adjustment are a minimum value (here, 0) and a maximum value (here, 255), are (30, 0) and (200, 255) respectively.

The input-output characteristics resulting from the histogram adjustment are specified by the two input-output points, that is, here the coordinates of the points Q1 and Q2, and a gamma ($\gamma$) adjustment parameter for determining curve shape. Thus, when y is the output value and x is the input value, the input-output characteristics resulting from the histogram adjustment can be expressed by the formula $y=b\times(x-a)^{1/\gamma}$. It should be noted that here, "b" and "a" are coefficients that are determined by the input and output points, that is, the points Q1 and Q2, and the "$\gamma$".

For example, when the "y" before the change to the histogram adjustment is "1", then following formulas (7) and (8) can be derived.

$$0=b\times(30-a)^{1/1} \tag{7}$$

$$255=b\times(200-a)^{1/1} \tag{8}$$

By solving these two formulas (7) and (8), it can be found that the two coefficients "a" and "b" are equal to "30" and "1.5", respectively. From this reason, the input-output characteristics of the histogram adjustment before the change have the relationship shown by formula (9).

$$y=1.5\times(x-30)^{1/1} \tag{9}$$

If the input-output characteristics of the histogram adjustment after the change are to pass through the point Q1 and the point Q2, then it is sufficient to change the gamma value "$\gamma$". When "$\gamma'$" is the gamma value after the change, "y" is the output value prior to the change and "y'" is the output value after the change, then it is possible to derive the following relationship (10). Further, since the output value "y" before the change is "75" at point W2 and the output value "y'" after the change is "122" at point W1, it is possible to find the "$\gamma'$" after the change as follows.

$$\begin{aligned}\gamma' &= \gamma \times \{\log(y/255)/\log(y'/255)\} \\ &= 1 \times \{\log(75/255)/\log(122/255)\} \\ &= 1.66\end{aligned} \tag{10}$$

When the "$\gamma'$" after the change is solved from this equation, it is found that "$\gamma'$" is equal to "1.66". In other words, the target change can be achieved by setting the gamma value "$\gamma$" to "1.66".

Using "1.66" as the gamma value "$\gamma'$" after the change in this way, the input-output characteristics of the histogram adjustment after the change are found. Here, the input-output characteristics of the histogram adjustment after the change pass through the points Q1 and Q2, like the input-output characteristics of the histogram adjustment before the change, and thus, like in the case described above, these can be found through the relationships (11) and (12) below.

$$0=b\times(30-a)^{1/1.66} \tag{11}$$

$$255=b\times(200-a)^{1/1.66} \tag{12}$$

By solving these two formulas (11) and (12), it can be found that the two coefficients "a" and "b" are equal to "30" and "11.56", respectively. From this, the input-output characteristics of the histogram adjustment after the change have the relationship shown in formula below (13).

$$y=11.56\times(x-30)^{1.66} \tag{13}$$

It should be noted that in this case, since the coordinates of the points Q1 and Q2 do not change, as the parameter for the histogram adjustment it is possible to change only the gamma value "$\gamma$" from "1.0" to "1.66".

CONCLUSION

In the above embodiment, the user can arbitrarily specify pixels on an image to be edited that is displayed in the preview window 170 and can designate a desired color for those pixels, and thus the user can easily change the image to be edited to a desired color tone without performing an adjustment through various conventional adjustments such as the histogram adjustment, the density correction, and the image adjustment.

In particular, when the user is to select a desired color, the user can select a desired color from the selection color patches 188 and 192 of a plurality of types of different colors that are provided in the color palettes 182 and 184, which are displayed on the screen, and thus the user can easily search for and designate a desired color.

Also, because the selection color patches 188 and 192 of a plurality of types of different colors that are displayed in the color palettes 182 and 184 are the selection color patches 188 and 192 of a plurality of types of different colors that are gradually different in their hue or lightness from the color that has been designated by the user, the user can search for colors that are relatively different from the color that has been designated. Thus, the user can search for a desired color more easily.

Also, by displaying two types of color palettes, the hue color palette 182 and the lightness color palette 184, the selection range can be widened even further and the user can more efficiently search for a desired color.

Also, when the overall color of the image to be edited is to be adjusted based on the color that has been designated by the user, the scanner driver does not execute adjustment in the form of the post-processing on an image on which adjustment or correction such as the histogram adjustment, the density correction, or the image adjustment has been performed already, but rather executes adjustment by changing the adjustment or correction that has already been performed, and by doing this, it is possible to reduce the occurrence of negative effects such as not being able to fully utilize the information of the original image (here, the image that has been read by the image reading device 10) or losing a smooth gradation.

In particular, the most upstream side adjustment element, that is, here, the histogram adjustment, among a plurality of the adjustment elements, such as the histogram adjustment, the density correction, and the image adjustment, is changed in order to adjust the overall color of the image to be edited, and thus it is possible to perform an adjustment of the overall image while avoiding problems such as overflow as much as possible.

Method for Displaying the Hue Color Palette

Here, the method for displaying the hue color palette 182 is described in detail. As shown in FIG. 14, the selection color patches 188 of the hue color palette 182 are set so that their hue changes toward each of the colors yellow (Y), red (R), magenta (M), blue (B), cyan (C), and green (G) from the color of the designated color patch 186.

(1) Making the Lightness Uniform

Here, when setting the color of each of the selection color patches 188, if the RGB values of each of the selection color patches 188 are set by simply increasing the blue (B) value for the blue (B) direction, increasing the red (R) value for the red (R) direction, reducing the blue (B) value for the yellow (Y) direction, reducing the green (G) value for the magenta (M) direction, and reducing the red (R) value for the cyan (C) direction, the lightness are also changed at the same time as the hue. When the lightness is changed at the same time as the hue, it becomes hard to select an appropriate hue, and it becomes necessary to adjust the lightness after adjustment of the hue. Thus, the adjustment by the user becomes complicated. As a result, it is desirable for each of the selection color patches 188 of the hue color palette 182 to be set in such a way that the lightness changes little. Also, by changing the center color (the color of the designated color patch 186) of the hue color palette 182 each time, various adjustments that include large color adjustments by repeating the operation become possible, but at this time, for example, when the user performs one adjustment toward blue (B) and next performs one adjustment toward yellow (Y), which is the opposite color, after that it is preferable that the color is returned to the same color as before the operation is performed. By doing this, the user can redo an adjustment with ease and thus an adjustment toward a desired color tone becomes easier.

Figures 20, 21:
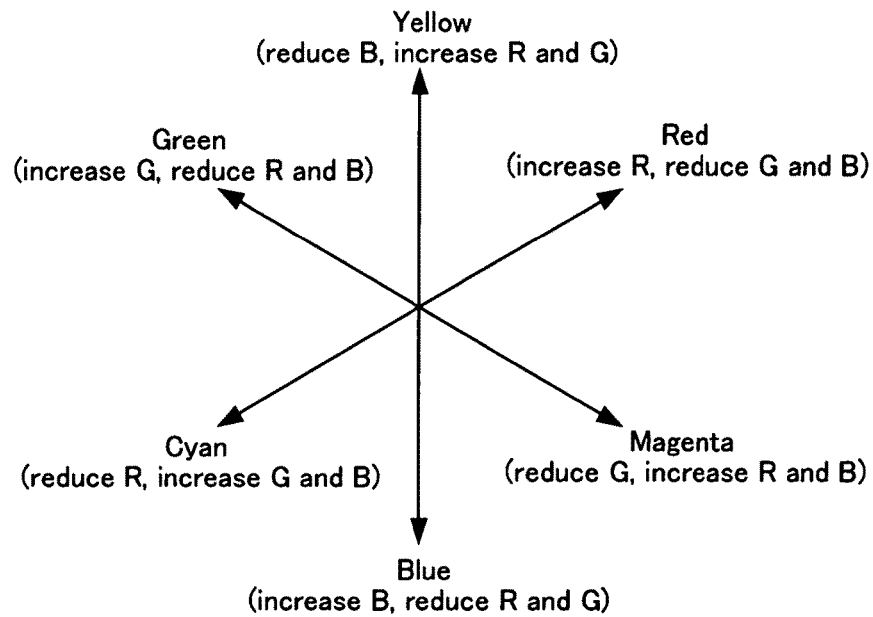
FIG. 20 is an explanatory diagram of the method for adjusting the values of each RGB color in the hue color palette.
FIG. 21 is an explanatory diagram of the value of "K1" in a case where Kr, Kg, and Kb are predetermined values.

Accordingly, in this embodiment, when setting the color of each of the selection color patches 188, when the value of either one color of red (R), green (G), or blue (B) is increased or decreased in the direction of each colors, each values of the remaining two colors are either increased or decreased. Thus, the lightness of the color of each of the selection color patches 188 is set to become substantially uniform. FIG. 20 describes a method for adjusting the values of the colors red (R), green (G), and blue (B) when setting the values so that the hue changes toward a color of yellow (Y), red (R), magenta (M), blue (B), cyan (C), and green (G) respectively. As shown in FIG. 20, in the blue (B) direction (the downward direction in the drawing), the value of blue (B) is increased and the values of green (G) and red (R) are decreased respectively at the same time. In the red (R) direction (the diagonally upward right direction in the drawing), the value of red (R) is increased and the values of green (G) and blue (B) are decreased respectively at the same time. In the green (G) direction (the diagonally upward left direction in the drawing), the value of green (G) is increased and the values of red (R) and blue (B) are decreased respectively at the same time.

On the other hand, in the yellow (Y) direction (the up direction in the drawing), the value of blue (B) is reduced and the values of green (G) and red (R) are increased respectively at the same time. In the magenta (M) direction (the diagonally downward right direction in the drawing), the value of green (G) is reduced and the values of red (R) and blue (B) are increased respectively at the same time. In the cyan (C) direction (the diagonally downward left direction in the drawing), the value of red (R) is reduced and the values of green (G) and blue (B) are increased respectively at the same time. In this way, it is possible to maintain a substantially constant lightness for each of the selection color patches 188, whose hues are different in the directions of each of the colors yellow (Y), red (R), magenta (M), blue (B), cyan (C), and green (G).

Calculating the RGB Color Values

To keep a constant lightness while changing the hue, it is necessary to hold a constant lightness ("L") that is calculated from the RGB values. Here, the lightness ("L") can be found through formula (14) below.

$$L = Kr \times R + Kg \times G + Kb \times B \tag{14}$$

It should be noted that here, "R", "G", and "B" indicate the values of the colors red (R), green (G), and blue (B) respectively. Also "Kr", "Kg", and "Kb" are coefficients corresponding to each of the colors red (R), green (G), and blue (B), respectively. The relationships $Kg \geq Kr$ and $Kg \geq Kb$ are satisfied. This is because in general, there is a high percent contribution toward the lightness of green (G). The values of each of the coefficients "Kr", "Kg", and "Kb" are set such that Kr=0.2, Kg=0.6 and Kb=0.2, for example.

Here, "R0", "G0", and "B0" are assumed as the values of each of the RGB colors of the designated color patch 186 located in the middle, and "L0" is the lightness of the designated color patch 186. Accordingly, the lightness L0 of the color of the designated color patch 186 can be found through formula (15) below.

$$L0 = Kr \times R0 + Kg \times G0 + Kb \times B0 \tag{15}$$

The colors of the selection color patches 188 are set so as to maintain the lightness "L0".

In the case of changing the hue in the red (R) direction, the red (R) value is increased and the green (G) and blue (B) values are decreased so as to hold the lightness substantially constant. Since red (R) is relatively increased, green (G) and blue (B) are reduced by the same amount. If "β1" is the amount by which red (R) is increased and "α1" is the amount by which green (G) and blue (B) are decreased, then the following formula (16) is satisfied.

$$\begin{aligned} L0 &= Kr \times R0 + Kg \times G0 + Kb \times B0 \\ &= Kr \times (R0 + \beta 1) + Kg \times (G0 - \alpha 1) + Kb \times (B0 - \alpha 1) \end{aligned} \tag{16}$$

From this formula 16 it can be understood that it is necessary for the following relationship (17) to be satisfied.

$$Kr \times \beta 1 + Kg \times (-\alpha 1) + Kb \times (-\alpha 1) = 0 \tag{17}$$

From the relationship (17), it can be understood that it is sufficient for "β1" to equal "α1" multiplied by (Kg+Kb)/Kr. It should be noted that here, when Kr=0.2, Kg=0.6 and Kb=0.2, "β1" is four times "α1". Here, the total of each of the RGB values that are increased or decreased is β1+α1=(1+(Kg+Kb)/Kr)×α1=5×α1.

Likewise in the case of changing the hue in the green (G) direction, if "β2" is the amount by which green (G) is increased and "α2" is the amount by which red (R) and blue (B) are decreased, like in the case of red (R), to keep a constant lightness it is necessary for the following relationship (18) to be satisfied.

$$Kr \times (-\alpha 2) + Kg \times \beta 2 + Kb \times (-\alpha 2) = 0 \tag{18}$$

From the relationship (18) it can be understood that it is sufficient for "$\beta 2$" to equal "$\alpha 2$" multiplied by $(Kr+Kb)/Kg$. It should be noted that here, if Kr=0.2, Kg=0.6 and Kb=0.2, then "$\beta 2$" is 3/2 times "$\alpha 2$". Here, the total of the RGB values that are increased or decreased is $\beta 2+\alpha 2=(1+Kg/(Kr+Kb))\times \alpha 2=5/2\alpha 2$.

Likewise in the case of changing the hue in the blue (B) direction, if "$\beta 3$" is the amount by which blue (B) is increased and "$\alpha 3$" is the amount by which red (R) and green (G) are decreased, then in the same way, to keep a constant lightness it is necessary for the following relationship (19) to be satisfied.

$$Kr \times (-\alpha 3) + Kg \times (-\alpha 3) + Kb \times \beta 3 = 0 \tag{19}$$

From the relationship (19) it can be understood that it is sufficient for "$\beta 3$" to equal "$\alpha 3$" multiplied by $(Kr+Kg)/Kb$. It should be noted that here, if Kr=0.2, Kg=0.6 and Kb=0.2, then "$\beta 3$" is four times "$\alpha 3$". Here, the total of the RGB values that are increased or decreased is $\beta 3+\alpha 3=(1+(Kr+Kg)/Kb)\times \alpha 3=5\times \alpha 3$.

To align the change in the values in each of the red (R), green (G), and blue (B) directions, that is, the total of the RGB values that are increased and decreased, the values of "$\beta 1+\alpha 1$", "$\beta 2+\alpha 2$", and "$\beta 3+\alpha 3$" can be matching values. By adopting a relationship for $\alpha 1$, $\alpha 2$, and $\alpha 3$ that satisfies the following relationship (20), it is possible to change the hue in the various color directions in such a manner that the amount of change is equalized.

$$(1+(Kg+Kb)/Kr)\times \alpha 1 = (1+Kg/(Kr+Kb))\times \alpha 2 \tag{20}$$
$$= (1+(Kr+Kg)/Kb)\times \alpha 3$$

Here, the relationship between $\alpha 1$, $\alpha 2$, and $\alpha 3$ is found using the coefficients Kr, Kg, and Kb. If Kr=0.2, Kg=0.6 and Kb=0.2, then "$5\times \alpha 1=5/2\times \alpha 2=5\times \alpha 3$", and thus it can be understood that it is sufficient for "$\alpha 1=\alpha 3$ and $\alpha 2=2\times \alpha 1$".

It should be noted that the following description is made with the case of Kr=0.2, Kg=0.6 and Kb=0.2, but even in a case where Kr, Kg, and Kb are different values from these, it is possible to find the RGB values through the same computation.

If Kr=0.2, Kg=0.6 and Kb=0.2, the RGB values when the hue is changed in the red (R) direction are "$R=R0+4\times \alpha 1$, $G=G0-\alpha 1$, and $B=B0-\alpha 1$". The RGB values when the hue is changed in the green (G) direction are "$R=R0-3\times \alpha 1$, $G=G0+2\times \alpha 1$, and $B=B0-3\times \alpha 1$". The RGB values when the hue is changed in the blue (B) direction are "$R=R0-\alpha 1$, $G=G0-\alpha 1$, and $B=B0+4\times \alpha 1$".

On the other hand, the increase and decrease in the RGB values are inverted if the hue is changed in the cyan (C) direction, which is "$R=R0-4\times \alpha 1$, $G=G0+\alpha 1$, and $B=B0+\alpha 1$". The RGB values in the case of changing the hue in the magenta (M) direction are "$R=R0+3\times \alpha 1$, $G=G0-2\times \alpha 1$, and $B=B0+3\times \alpha 1$". The RGB values in the case of changing the hue in the yellow (Y) direction are "$R=R0+\alpha 1$, $G=G0+\alpha 1$, and $B=B0-4\times \alpha 1$".

In this way, the colors of the selection color patches 188, whose hues differ in the directions of each of the colors yellow (Y), red (R), magenta (M), blue (B), cyan (C), and green (G) are set. Thus, the following i) and ii) can be achieved.

i) The hue is changed in the various directions while keeping a substantially constant lightness.

ii) When given adjustments are performed on the side opposite the center color (the color of the designated color patch 186) respectively, the color becomes substantially the center color prior to adjustment.

(2) Measures Taken when the RGB Values are Small or Large

The change in the hue is a change in the ratio of each of the colors red (R):green (G):blue (B). An example of a simple method for changing this ratio is the method of taking a multiple of each of the RGB values. That is, for example, if the blue (B) is to be reduced, then it is conceivable to multiply the value for B by a factor of 0.95. However, as in this embodiment, in a case where the values of each of the RGB colors are expressed in 8 bits (integers from 0 to 255), for example, when the blue (B) value of the color of the designated color patch 186 in the center is less than 10, multiplying this by a factor of 0.95 and rounding off to the nearest integer will not lead to a change. That is, if the value of blue (B) is "9", for example, then 9×0.95=8.55, and when the digits after the decimal point are rounded off to the nearest integer, the result is "9", and thus does not change. When there is a condition under which change does not occur, there will be the problem that no adjustment will be performed no matter how many times the user performs an adjustment operation.

When the change in the hue for colors with low lightness is made suitable, the change in the hue for colors with large RGB values and high lightness becomes small and it becomes no longer possible to perform favorable adjustment. In other words, for example, assume that the value of blue (B) of the selection color patch 188 that has been changed in the blue (B) direction on the hue color palette 182 has been increased by one. If the value of blue (B) of the center color (the color of the designated color patch 186) is "10", then the value of blue (B) of the selection color patch 188 becomes "11" by "10+1", and thus is multiplied by 11/10=1.1 for a change of 10%. However, if the value of blue (B) of the center color (the color of the designated color patch 186) is "200", then "200+1=201", and the multiplication factor becomes "201/200=1.005", which is a change of only 0.5%. With such change of 0.5%, a change in the hue cannot be sufficiently recognized, and it is not possible to achieve a comfortable adjustment.

Accordingly, in this embodiment the following method is adopted in order to prevent such problems from occurring. The method is described in detail below.

As mentioned above, the colors of the selection color patches 188, whose hues are each different in the directions of each of the colors yellow (Y), red (R), magenta (M), blue (B), cyan (C), and green (G), that is, the RGB values, can be expressed as an increase or decrease with respect to the RGB values of the center color (the color of the designated color patch 186). Here, if "K1" is the coefficient for expressing the increase or decrease in the RGB values of each the selection color patches 188, then the RGB values of each of the selection color patches 188 can be expressed by formula (21) below.

(RGB values of each of the selection color patches)=
(RGB values of the designated color patch)+$K1 \times \alpha 1$  (21)

Here, if Kr=0.2, Kg=0.6 and Kb=0.2, then "K1" becomes the values shown in FIG. 21.

In this embodiment, in order to prevent the above problem from occurring, a suitably large amount of change with respect to the RGB values of the center color (the color of the designated color patch 186) is obtained if the RGB values are large. Here, by using the lightness (L0) of the center color (the color of the designated color patch 186), in a case where the RGB values are large, the value of "α1" is set so that the amount of change with respect to the RGB values of the center color (the color of the designated color patch 186) becomes large. By performing this setting, it is possible to prevent the above problem. The value of "α1" is found through formula (22) shown below.

$$\alpha 1 = K2 \times L0 \quad (22)$$

Here, K2 is a coefficient. Thus, the amount of change with respect to the RGB values of the center color (the color of the designated color patch 186) is "K1×K2×L0". For example, the R value of "K1" in the red (R) direction is K1=4. Thus, if the brightness (L0)=100, then the amount of the change is 400×K2. Considering that the value leading to an appropriate change, including fine adjustments, under these conditions is about 4, it is sufficient for K2=4/400=0.01.

On the other hand, if the lightness is low, that is, if each of the RGB values are small, in order to obtain a reliable change in the values that are displayed, it is necessary to maintain 1 or more, which is the minimum unit with which the absolute value of K1×α1 is displayed. With regard to this, it is sufficient for the following relationships (23) and (24) to be satisfied.

When excluding values after the decimal point of the calculation results $$\alpha 1 \geq \alpha(1/K1) \quad (23)$$

When rounding off values after the decimal point of the calculation results $$\alpha 1 \geq (0.5/K1) \quad (24)$$

As shown in FIG. 21, if Kr=0.2, Kg=0.6 and Kb=0.2, then the minimum value of the absolute value of K1 is "1". Thus, in a case where the values after the decimal point of the calculation results are to be excluded, it is sufficient for "α1" to be "1" or more. If rounding is to be performed in the calculation, then "0.5" or more is sufficient. In this embodiment, since the values after the decimal point of the calculation results are rounded off, as described above, after "α1=K2×L0" has been found, "α1=0.5" if "α1" is less than 0.5.

Thus, the following item iii) can be achieved.

iii) Even small RGB values are reliably changed, and an appropriate change is obtained in the case RGB values are large.

(3) Differing the Amount by which the Hue is Changed within and Outside the Color Palette.

The above calculation is adopted for the innermost side selection color patches 188 (in FIG. 14, the selection color patches Y1, R1, M1, B1, C1, and G1) of each of the directions, which are adjacent to the designated color patch 186 of the hue color palette 182. Here, the hue color palette 182 can be made of only six selection color patches 188 that are adjacent to the designated color patch 186, however as illustrated in FIG. 14, in addition to this, having a plurality of stages of selection color patches 188 (in FIG. 14, the selection color patches Y2, Y3, R2, R3, M2, M3, B2, B3, C2, C3, G2, and G3) makes the color adjustment easy, and in particular, it is preferable that there is a large change in the hue at the selection color patches 188 at the outer side because this makes adjustment easier and makes changes in color to be more readily appreciated.

Accordingly, in this embodiment, three stages of the hue selection color patches 188 are provided outside the designated color patch. The selection color patches 188 with the three stages of hue are set so that the further to the outer side the selection color patch is located, the greater the change in its hue.

If calculation is performed by increasing and decreasing each of the RGB values, as in the present embodiment, in order to increase the change in the hue the further to the outer side the patch is located, this can be realized by multiplying the amount by which the RGB values are increased or decreased by a multiplication factor. The following formulas (25) through (27) illustrate an example of the method for calculating each of the RGB values of each of the selection color patches 188.

Selection color patch adjacent to the designated color patch $$\text{(selection color patch value)} = \text{(center color value)} + K1 \times \alpha 1 \quad (25)$$

Selection color patch located second outer from the designated color patch $$\text{(selection color patch value)} = \text{(center color value)} + K1 \times \alpha 1 \times m \quad (26)$$

Selection color patch located third outer from the designated color patch $$\text{(selection color patch value)} = \text{(center color value)} + K1 \times \alpha 1 \times m \quad (27)$$

Here, if m>2 and n>3, then the farther away the patch is located, the greater the change in hue that is obtained.

In this embodiment, the amount of the change is made larger as the distance becomes larger by setting m=3 and n=6. By doing this, it is possible to fine tune the change in the hue of the selection color patches 188 adjacent to the designated color patch 186, and it is also possible to make comparatively large adjustments to the hue. It is also possible for the change in the overall color to become easier to recognize. It should be noted that in this embodiment three selection color patches 188 are provided in a line toward the outer side from the designated color patch 186, it is also possible for a larger number of selection color patches 188 to be disposed in a line. It is possible to use the same calculation method in this case as well. For the sake of an easily recognized hue and operability improvement, it is preferable that the number of selection color patches 188 lined up toward the outer side from the designated color patch 186 is about from 2 to 6.

Thus, it is possible to achieve the following item iv).

iv) A plurality of patches are provided in a line toward the outer side, and the amount of change in the hue increases as the distance toward the outer side increases.

(4) Method for Setting the Color of Intermediate Selection Color Patches

In the hue color palette 184 in this embodiment, for the patches which are located second and third to the outer side from the designated color patch 186, there are selection color patches 188 disposed intermediate between the directions of each of the colors yellow (Y), red (R), magenta (M), blue (B), cyan (C), and green (G) (in FIG. 14, the selection color patches YR1, YR2, YR3, RM1, RM2, RM3, BM1, BM2, BM3, CB1, CB2, CB3, GC1, GC2, GC3, YG1, YG2, and YG3). Although it is also possible to not display anything is this section, disposing the selection color patches 188 in this section as well makes it easier to recognize a change in the hue. Each of the RGB values of the selection color patches 188 disposed in these intermediate sections are set to values that are intermediate to the selection color patches in six directions located on either side of that selection color patch, that is, the selection color patches 188 with each different hues in the directions of each of the colors yellow (Y), red (R), magenta (M), blue (B), cyan (C), and green (G), and by doing this, it is possible to achieve a smooth circular transition in the hue. The RGB values of the selection color patches 188 located between the selection color patches 188 located second to the outer side from the designated color patch 186 (in FIG. 14, the selection color patches YR1, RM1, BM1, CB1, GC1, and YG1) can be found through the following formulas (28) to (30). It should be noted that here, "Ri", "Gi", "Bi" and "Rj", "Gj", "Bj" are the RGB values of the selection color patches 188 that are located on either side (in FIG. 14, the selection color patches Y2, R2, M2, B2, C2, and G2).

$$R=(Ri+Rj)/2 \tag{28}$$

$$G=(Gi+Gj)/2 \tag{29}$$

$$B=(Bi+Bj)/2 \tag{30}$$

The RGB values of the selection color patches 188 that are located between the selection color patches 188 located third to the outer side from the designated color patch 186 (in FIG. 14, the selection color patches YR2, YR3, RM2, RM3, BM2, BM3, CB2, CB3, GC2, GC3, YG2, and YG3) can be found through the following formulas (31) to (33). It should be noted that here, "Rh", "Gh", "Bh" and "Rk", "Gk", "Bk" are the RGB values of the selection color patches 188 that are located on either side of the selection color patches 188 that are disposed intermediate to the patches located third to the outer side from the designated color patch 186 (in FIG. 14, the selection color patches Y3, R3, M3, B3, C3, and G3). Of these, "Rh", "Gh", and "Bh" are the RGB values of the adjacent selection color patch 188 on the near side. "Rk", "Gk", and "Bk" are the RGB values of the selection color patches 188 on the far side.

$$R=Rh\times 2/3+Rk/3 \tag{31}$$

$$G=Gh\times 2/3+Gk/3 \tag{32}$$

$$B=Bh\times 2/3+Bk/3 \tag{33}$$

With these formulas (28) through (33) it is possible to achieve the following item v).

v) Selection color patches 188 with appropriate hues are disposed intermediate to the selection color patches 188 that are located to the outer side in the six color directions.

(5) Additional Matters

Since the values that are obtained are ultimately set as integers, in this embodiment the digits after the decimal place are rounded. It should be noted that RGB values less than 0 are regarded as "0", and those over 255 are regarded as "255". This is because values that are below 0 or greater than 255 cannot be handled based on the premise of the embodiment, in which the RGB colors are expressed in 8 bits (integers from 0 to 255).

The description made here was with regard to an example in which each of the RGB colors are expressed by 8 bits (for example, integers from 0 to 255), but it is also possible for the RGB colors to be expressed by other numbers of bits, such as 16 bits (integers from 0 to 65535) and the like.

Method for Displaying the Lightness Color Palette

Here, the method for displaying the lightness color palette 184 is described in detail. In this embodiment, as described in FIG. 15, each of the selection color patches 192 of the lightness color palette 184 are set so that the brightness changes toward lighter and darker shades of the color of the designated color patch 190.

(1) Making the Lightness Uniform

The lightness color palette 184 is the opposite to the hue color palette 182 in that the RGB values of each of the selection color patches 192 are set so that their hue remains constant. Thus, an intended adjustment becomes easy. Also it is preferable that after the lightness has been adjusted once toward the higher lightness, and it is then adjusted once toward the lower lightness, the color returns to substantially the same color as before performing the operation. By doing this, the user can easily redo an adjustment that has been made and thus can more easily make an adjustment to a desired color tone.

To hold the hue, it is sufficient for a constant ratio of red (R), green (G), blue (B) to be maintained, and to make changes while maintaining a constant ratio of red (R), green (G), blue (B), it is sufficient for each to be multiplied by a fixed multiplication factor.

Here, in the direction in which the lightness is increased, it is the standard for each of the RGB values of the three colors to be multiplied by a constant "K3". Conversely, in the direction in which the lightness is reduced, they are divided by the constant "K3". That is, they are multiplied by 1/K3.

Thus, the following items i) and ii) can be achieved.

i) The changing of the brightness while holding the hue substantially constant.

ii) When a given adjustment is performed on the side opposite the center color respectively, the color becomes substantially the center color prior to the adjustment.

(2) Measures when RGB Values are Small or Large

However, like in the case of the hue color palette 182 described above, the method of multiplying by a multiplication factor may result in instances where absolutely no change occur in cases where the RGB values before the change are small. When there is a condition under which change does not occur, then there will be the problem that appropriate adjustment result cannot be obtained regardless of how many times the user performs the adjustment operation.

Accordingly, a process of adding a constant "δ" before constant multiplication, and then subtracting "δ" after the constant multiplication is taken. In other words, when "R", "G", and "B" are the RGB values before the change, and "R''", "G''", and "B''" are the RGB values after the change, then when making a change to the next higher lightness, the values can be found through formulas (34) to (36) below.

$$R''=(R+\delta)\times K3-\delta \tag{34}$$

$$G''=(G+\delta)\times K3-\delta \tag{35}$$

$$B''=(B+\delta)\times K3-\delta \tag{36}$$

On the other hand, when making a change to the next lower lightness, the values can be found through formulas (37) to (39) below.

$$R''=(R+\delta)/K3-\delta \tag{37}$$

$$G''=(G+\delta)/K3-\delta \tag{38}$$

$$B''=(B+\delta)/K3-\delta \tag{39}$$

Here, "δ" is a constant that is given in connection with the value of the constant "K3" in order to secure a change in the value by the above transformation even if an RGB value is small. Because "δ×K3−δ≧0.5", the condition for the value to be changed by rounding off even if the RGB values include a "0", can be found by "δ≧0.5/(K3−1)".

Here, the value of "K3" is preferably 1.01 to 1.05 so that the change in the lightness can be fine-tuned on the order of several %, and in the examples, they are "K3=1.02". The condition of "δ" in this case is "δ≧25", so "δ=25".

It should be noted that in order to address the fact that a plurality of the selection color patches 192 of the lightness color palette 184 are lined up, it is sufficient to repeat the transformation through the above formulas for each one step.

In the hue color palette 182 described above, the values were set so that the amount of change in the hue increases the farther to the outer side the selection color patches 188 are, however since the change in the lightness is easier to recognize than the change in the hue, it is not particularly necessary for the amount of the change to increase with increased distance to the outer side. It should be noted that it is of course possible to increase the amount of the change the farther to the outer side the selection color patches 192 are, of the lightness color palette 184.

Thus, it is possible to achieve the item iii) below.

iii) The RGB values are reliably changed, even if they are small.

It should be noted that here the description made was with regard to an example in which the RGB colors are expressed in 8 bits (for example, integers from 0 to 255), but it is also possible for the RGB colors to be expressed in other numbers of bits, such as in 16 bits (integers from 0 to 65535) for example.

Other Embodiments 1

In the foregoing embodiment, the user designates a desired color through the color palettes 182 and 184, but here "color designation" does not necessarily require designation of a desired color by the user through these color palettes 182 and 184. That is to say, it is also possible for the user to designate a desired color by directly entering values for each colors red (R), green (G), and blue (B), or the user can designate a pixel on the image and then designate a color.

It is not absolutely necessary to designate a desired color using the hue color palette 182 or the lightness color palette 184 as editing palettes, and it is also possible to designate a desired color using other types of color palettes, for example, such as a color palette in which a plurality of types of colors are simply lined up.

In the foregoing embodiment, the histogram adjustment is changed to adjust the overall color of the image to be edited, so that the pixel that has been designated by the user becomes the color that has been designated by the user, but it is not absolutely necessary for the adjustment made to the overall color of the image to be limited to only the histogram adjustment in this way. That is, with regard to the change that is performed here, it is also possible to adjust the overall color of the image so that the pixel that has been designated by the user becomes the color that has been designated by the user by changing various adjustments (corrections) besides the histogram adjustment, such as the density correction or the image adjustment.

As for the order in which the various adjustments (corrections) are executed on the input image, such as the image that is read by the image reading device 10, these were executed in the order of <histogram adjustment>→<image adjustment (excluding saturation)>→<density correction>→<image adjustment (saturation)> as described before, however it is also possible for the order of the various adjustments (corrections), etc. that are executed on the input image to be an order other than these order. That is, for example, they can also be executed in the order of <image adjustment (excluding saturation)>→<image adjustment (saturation)> or executed in the order of <density correction>→<histogram adjustment>→<image adjustment (excluding saturation)>→<image adjustment (saturation)>.

In the foregoing embodiment, by the user designating a desired color for a pixel that was designated by the user on the image to be edited, the designation of "second output data," that is, here at least one output data from the image adjustment (excluding saturation), the density correction, and the image adjustment (saturation) was specified, however the designation of "second output data" (here, at least one output data from the image adjustment (excluding saturation), the density correction, and the image adjustment (saturation)) is not always limited to a case of color designation such as this. In other words, as long as the attribute of the "second output data" (here, at least one output data from the image adjustment (excluding saturation), the density correction, and the image adjustment (saturation)) is changed, any method may be employed by the user to change the attribute.

In the foregoing embodiment, the example of the "first data conversion section" was the conversion of the data of the pixels making up the image read by the image reading device 10 by the scanner driver through the histogram adjustment, but the "first data conversion section" mentioned here is not necessarily limited only to such a case in which the conversion of data is executed through histogram adjustment. That is, regarding the "first data conversion section" mentioned here, any adjustment may be included in the "first data conversion section" as long as that adjustment is performed more to the upstream side than another adjustment, based on the order in which the various adjustments such as the histogram adjustment, the density correction, and the image adjustment are executed.

In other words, in the present embodiment, the image adjustment (excluding saturation) is executed more to the upstream side than the density correction and the adjustment of the saturation, also corresponds to the "first data conversion section" discussed here. In this case, the density correction and the adjustment of the saturation correspond to the "second data conversion section." Similarly, the density correction, which is executed more to upstream side than the adjustment of the saturation, corresponds to the "first data conversion section" discussed here. In this case, the adjustment of the saturation corresponds to the "second data conversion section." In the present embodiment, the histogram adjustment, which is located at the most upstream side, has the greatest effect and thus is targeted for a change to its setting information.

It is not absolutely necessary for the "first data conversion section" mentioned here to be limited to a single adjustment element. That is, according to the present embodiment, the "first data conversion section" is not limited to the histogram adjustment, and can also include the image adjustment or the density correction. Further, if the order in which the various adjustments are executed is different, then the "first data conversion section" may also include the adjustment of the saturation.

The same applies for the "second data conversion section" as well, and in the foregoing embodiment, the scanner driver executed the image adjustment (excluding saturation), the density correction, and the adjustment of the saturation as the "second data adjustment section", but it is not always limited to this case. That is, the "second data conversion section" mentioned here may include any adjustment, as long as that adjustment is executed further at the downstream side of other adjustment, based on the order in which each adjustment such as the histogram adjustment, the density correction, and the image adjustment are to be executed. Further, if the order in which the various adjustments are being executed is different, then the "second data conversion section" may also include the histogram adjustment.

In the foregoing embodiment, the color palettes 182 and 184 were displayed as "editing palettes" so that the user may designate a desired color for a pixel that was designated by the user, but the case in which the "editing palette" mentioned here is used is not always limited to a case in which it is used by the user to designate a desired color for a pixel that he has designated. In other words, the color palettes 182 and 184 can be displayed as "editing palettes" for purposes other than for the user to designate a desired color for a pixel that he has specified.

Also, in the foregoing embodiment, two types of color palettes, that is, the hue color palette 182 and the lightness color palette 184, were displayed as the "editing palette," but it is not absolutely necessary for two types of color palettes 182 and 184 to be displayed as the "editing palette" in this way. That is, it is also possible for either one of the hue color palette 182 or the lightness color palette 184 to be displayed as the "editing palette."

Also, it is not absolutely necessary for the hue color palette 182 to be provided with selection color patches 188 (second patches) in such a manner that the hue changes toward each of the colors yellow (Y), red (R), magenta (M), blue (B), cyan (C), and green (G), as described above, and the hue color palette 182 can take on any form as long as it is provided with selection color patches 188 (second patches) in such a manner that the hue changes. In the foregoing embodiment, the selection color patches 188 (second patches) are disposed surrounding the designated color patch 186 (first patch) in the center, but it is not absolutely necessary that they are disposed in this shape.

It is not absolutely necessary for the lightness color palette 184 to be provided with a plurality of types of selection color patches 192 (second patches) each of whose lightness changes toward a brighter direction or a darker direction as described before, and it is also possible for the lightness color palette 184 to be provided with a plurality of types of the selection color patches 192 (second patches) that change toward either one of a brighter direction or a darker direction. Of course, as long as the lightness color palette 184 is provided with the selection color patches 192 (second patches) in such a manner that the lightness changes, the lightness color palette 184 may take any form. In the foregoing embodiment, the selection color patches 192 (second patches) are disposed in a straight line form in the vertical direction with the designated color patch 190 (first patch) in the center, but it is not absolutely necessary that they are disposed in this shape.

In the foregoing embodiment, the hue color palette 182 and the lightness color palette 184 were displayed as the "editing palette" on the screen of the same display device 24 as that of the preview window 170 in which the image to be edited is displayed, but the "editing palette" discussed here does not necessarily have to be displayed on the screen that the image to be edited is displayed on. In other words, it is also possible for the "editing palette" to be displayed on a screen that is different from the screen on which the image to be edited is displayed on, that is, for example, on a display device that is different from the display device on which the image to be edited is displayed on.

Other Embodiments (2)

Above, an example based on one embodiment of a case in which an image reading system furnished with an image reading device is adopted was described, but the foregoing embodiment is for the purpose of facilitating understanding of the present invention, and is not to be interpreted as limiting the present invention. The invention can of course be altered and improved without departing from the gist thereof and includes functional equivalents. In particular, the embodiments mentioned below also fall within the scope of the present invention.

Regarding the Image

The foregoing embodiment described an example of the "image to be edited" as an image that has been read from the original document 15 by the image reading device 10, but the "image to be edited" discussed here is not limited to an image that has been read from the original document 15 by the image reading device 10 like this, and various types of images that can be edited by the user correspond to the "image to be edited" discussed here.

Regarding the Image Display Section

The foregoing embodiment described a case in which the display device 24 served as an example of the "image display section," but in addition to the display device 24, the "image display section" discussed here may be any "image display device" as long as it is an "image display device" that displays the image to be edited.

Regarding the Pixels (1)

The foregoing embodiment described a case in which a single pixel that was arbitrarily designated from the image to be edited served as the "pixel", but as for the "pixel" discussed here, it is not limited to such a single pixel that has been arbitrarily designated, and it is also possible to designate a plurality of pixels in a specified region on the image to be edited, or for the user to arbitrarily designate pixels of two or more numbers, for example.

Regarding the User

The user include not only the person who uses the image reading system 2 that includes the image reading device 10 and the computer device 20, but also the person who performs maintenance on the image reading system 2 and the like, and as long as the person uses the image reading system 2 to arbitrarily designate a pixel on the image to be edited that is displayed on the image display section and also designates a desired color for that pixel, any person may function as the user.

Further, with regard to the user, it is also possible for the person who arbitrarily designates a pixel on the image to be edited that is displayed on the image display section and the person who designates a desired color for that pixel to be separate users.

Information on the Pixel

The foregoing embodiment described a case in which, as the "information on the pixel", the information on the position, that is, the coordinates, for example, of the pixel that the user has designated with the pointer 176, for example, on the image that is displayed in the preview window, and the information on the color of that pixel, is obtained by the operation input section 86 through the input device, but the "information on the pixel" discussed here is not necessarily limited to information on the position (coordinates, etc.) and the information on the color of the pixel. In other words, it is also possible for other types of information to be obtained by the information obtaining section as the "information on the pixel" discussed here.

Information on the Desired Color

The foregoing embodiment described a case in which, as the "information on the desired color," the information on a patch, or the information on the color of that patch, that has been selected by the user from the selection color patches 188 and 192 displayed on the color palettes 182 and 184 that are displayed in the color palette adjustment dialog box 180 is obtained, but the "information on the desired color" discussed here is not necessarily limited to this information on the selected patch or the information on the color of that patch. In other words, it is also possible for other types of information to be obtained by the information obtaining section as the "information on the desired color" discussed here.

Regarding the Information Obtaining Section

The foregoing embodiment described a case in which the operation input section 86 inside the computer device 20 served as the "information obtaining section", but the "information obtaining section" discussed here does not have to be necessarily limited to the operation input section 86 in this way, and as long as it is the "information obtaining section" that obtains information on the pixel that is arbitrarily designated by the user and the information on the desired color that the user has designated for that pixel, any type of "information obtaining section" is possible.

Regarding the Color Adjustment Section

The foregoing embodiment described a case in which, as the "color adjustment section," the scanner driver adjusts the color of the overall image by making a change to the histogram adjustment based on the information on the pixel that is arbitrarily designated by the user and the information on the desired color that the user has designated, but it is not absolutely necessary that the "color adjustment section" described here is executed by such a scanner driver. In other words, as long as the overall color of the image is adjusted based on the information on the pixel that is arbitrarily designated by the user and the information on the desired color that the user has designated for that pixel, any type of "color adjustment section" is possible.

Regarding the Pixel (2)

As for the "pixels," for all of the pixels making up the image, the pixel data are converted to the first output data by the first data conversion section, and then the first output data are converted to the second output data by the second data conversion section, but it is not absolutely necessary for all the pixels that make up the image to be converted in this way.

Regarding the Data of the Pixels Making Up the Image

In the foregoing embodiment, since the first data conversion section is the histogram adjustment, the "data of the pixels making up the image" is the data of the pixels making up the image that has been read from the original document 15 by the image reading device 10, but the "data of the pixels making up the image" mentioned here also may include data that are converted and output after the various adjustments such as the histogram adjustment, the density correction, and the image adjustment have been performed on the data of the pixels making up the image.

Regarding the First Setting Information

In the foregoing embodiment, since the "first data conversion section" is the histogram adjustment, and the "first setting information" is the shadow input values $\alpha 11$, $\alpha 21$, $\alpha 31$, the shadow output values $\alpha 13$, $\alpha 23$, $\alpha 33$, the highlight input values $\alpha 12$, $\alpha 22$, $\alpha 32$, the highlight output values $\alpha 14$, $\alpha 24$, $\alpha 34$, the gamma values $\alpha 15$, $\alpha 25$, $\alpha 35$, the data $\alpha 41$ and $\alpha 42$ on the end portion shape of the tone curve, and the adjustment value $\alpha 51$ for the grayscale balance adjustment, of each of the colors R (red), G (green), and B (blue) in the histogram adjustment, but the "first setting information" is not necessarily limited to this case. That is, the "first setting information" can change depending on the form taken by the "first data conversion section."

Regarding the Second Setting Information

In the foregoing embodiment, since the "second data conversion section" corresponds to at least one of the image adjustment (excluding saturation), the density correction, and the image adjustment (saturation), the "second setting information" was the setting values $\gamma 1$, $\gamma 2$, $\gamma 4$, $\gamma 5$, $\gamma 6$, or the input coordinates $\beta 11$, $\beta 13$, $\beta 21$, $\beta 23$, $\beta 31$, $\beta 33$, ... and the output coordinates $\beta 12$, $\beta 14$, $\beta 22$, $\beta 24$, $\beta 32$, $\beta 34$ ... of a plurality of points P1, P2, P3, ..., or the setting value $\gamma 3$, but the "second setting information" is not necessarily limited to this case. That is, the "second setting information" can be different depending on the form taken by the "second data conversion section."

Regarding the First Output Data and the Second Output Data

In the foregoing embodiment, the output data Rout1, Gout1, and Bout1 of the histogram adjustment are served as an example of the "first output data," but the "first output data" discussed here are not necessarily limited to this case. In other words, the "first output data" may differ depending on the form taken by the "first data conversion section".

The same applies for the "second output data" as well, and in the foregoing embodiment, the output data Rout2, Gout2, and Bout2, the output data Rout3, Gout3, and Bout3, or the output data Rout4, Gout4, and Bout4, of at least one among the image adjustment (excluding saturation), the density correction, and the image adjustment (saturation) are served as an example of the "second output data", but the "second output data" discussed here are not necessarily limited to this case. In other words, the "second output data" may differ depending on the form taken by the "second data conversion section".

Regarding the Second Output Data Attribute

In the foregoing embodiment, the user performed the designation of color as the "second output data attribute", but it is not absolutely necessary for the "second output data attribute" mentioned here to be limited to such designation of color. That is, the "second output data attribute" may be any characteristic as long as that characteristic pertains to the "second output data".

Regarding the Setting Information Change Section

In the foregoing embodiment, the scanner driver changes the setting information of the histogram adjustment as the "first data conversion section", here, for example, the gamma values $\alpha 15$, $\alpha 25$, and $\alpha 35$, as the "setting information change section," but the "setting information change section" discussed here is not necessarily limited to this case. In other words, the "first setting information" that is changed by the "setting information change section" differs depending on the form that is taken by the "first data conversion section".

Regarding the First Patches

In the foregoing embodiment, the designated color patches 186 and 190, which are disposed in the center of the selection color patches 188 and 192 of a plurality of types of color, were described as an example of the "first patch", but it is not absolutely necessary that the "first patch" discussed here is provided on the editing palette (the hue color palette 182, the lightness color palette 184) in this form.

Also, in the foregoing embodiment, the designated color patches 186 and 190 that have the shape of a hexagon are provided as the "first patch," but it is not absolutely necessary that the "first patch" discussed here is provided on the editing palette (the hue color palette 182, the lightness color palette 184) in this form.

Regarding the Second Patches

In the foregoing embodiment, the selection color patches 188 of a plurality of types of colors that are disposed surrounding the designated color patch 186 in the center, and the selection color patches 192 of a plurality of types of colors that are disposed in a straight line form with the designated color patch 186 in the center, were described as the example of "second patches," but it is not absolutely necessary that the "second patch" discussed here is provided on the editing palette (the hue color palette 182, the lightness color palette 184) in this form.

Also, in the foregoing embodiment, the selection color patches 188 and 192 that have the shape of a hexagon are provided as the "second patch", but it is not absolutely necessary that the "second patch" discussed here is provided on the editing palette (the hue color palette 182, the lightness color palette 184) in this form.

Regarding the Editing Palette

In the foregoing embodiment, the two color palettes 182 and 184 were displayed in the color palette adjustment dialog box 180 as the "editing palette," but the "editing palette" discussed here is not limited to only a case in which it is displayed in the color palette adjustment dialog box 180 in this way. In other words, it can be displayed in any form as long as it is the "editing palette" that has the first patch with the same color as the color of the pixel that has been designated by the user, and second patches of a plurality of color types that differ in steps in at least one of their hue or lightness, with respect to the color of first patch.

Regarding the Palette Display Controller

In the foregoing embodiment, the display controller 88 of the main computer unit 22 was described as an example of the "palette display controller", but it is not absolutely necessary for the "palette display controller" described here to be limited to the display controller 88 of the main computer unit 22. In the foregoing embodiment, since the two color palettes 182 and 184 serving as the "editing palette" are displayed on the display device 24, on which the image to be edited is displayed, they are displayed by the display controller 88 of the main computer unit 22, but it is also possible to provide a separate "palette display controller" from the display controller 88 of the main computer unit 22 if the "editing palette" is displayed on the display section that is different from the display device 24 on which the image to be edited is displayed.

What is claimed is:

1. An image editing device comprising:
   a first data conversion section that converts data of pixels configuring an image into first output data based on first setting information;
   a second data conversion section that converts the first output data that has been converted by the first data conversion section into second output data based on second setting information; and
   a setting information change section that changes the first setting information when an attribute of the second output data for the pixel has been designated by a user,
   wherein the attribute of the second output data for a pixel configuring the image has been designated by the user, the setting information change section changes the first setting information so that the attribute of the second output data for the pixel becomes the attribute that has been designated by the user, and
   wherein the second output data having the attribute that has been designated by the user is inversely converted with the second data conversion section, and
   wherein the first setting information is changed so that the first output data converted with the first data conversion section becomes the second output data inversely converted with the second data conversion section.

2. An image editing device according to claim 1, wherein the second setting information is retained as is when the attribute of the second output data for the pixel has been designated by the user.

3. An image editing device according to claim 1, wherein when the attribute of the second output data for a pixel configuring the image has been designated by the user, the setting information change section changes the first setting information so that the attribute of the second output data for the pixel becomes the attribute that has been designated by the user.

4. An image editing device according to claim 1, wherein the data of the pixel is data of each RGB color of the pixel.

5. An image editing device according to claim 1, wherein the first data conversion section and the second data conversion section perform conversion to the first output data and the second output data, respectively, each time the attribute of the second output data for the pixel is designated by the user.

6. An image editing device according to claim 1, wherein designation of the attribute of the second output data by the user is carried out by designating a color for the pixel.

7. An image editing device comprising:
   an image display section on which an image to be edited is displayed;
   an information obtaining section that obtains information regarding a pixel that has been arbitrarily designated by a user on the image that has been displayed on the image display section; and
   a palette display controller that displays an editing palette that has a first patch with a same color as the color of the pixel that has been designated by the user, and second patches of a plurality of types of colors each different in steps in at least one of hue and lightness from the color of the first patch, based on information regarding the pixel that has been obtained by the information obtaining section;
   wherein the editing palette is provided with, as the second patches, a plurality of types of patches each different in steps in the hue from the color of the first patch, a plurality of the types of the patches having an equal lightness to one another.

8. An image editing device according to claim 7, wherein the first patch, adjacent to at least one of the second patches of a plurality of the types of colors, is disposed on the editing palette.

9. An image editing device according to claim 7, wherein an amount of change in the hue of the second patches with respect to the color of the first patch differs depending on the lightness of the first patch.

10. An image editing device according to claim 7, wherein there are different amounts of change in the hue between the second patches of a plurality of the types of colors, each different in steps in the hue from the color of the first patch.

11. An image editing device according to claim 7, wherein the second patches of a plurality of the types of colors, each different in steps in the hue from the color of the first patch, are disposed surrounding the first patch in the center.

12. An image editing device according to claim 7, wherein the editing palette is provided with a color save region for storing the color of patches that have been designated by the user from among the second patches of a plurality of the types of colors.

13. An image editing device according to claim 7, wherein when the user has selected one from among the second patches of a plurality of the types of colors, the palette display controller displays the editing palette with a patch having the color of the patch that has been selected serving as the first patch.

* * * * *